US007367760B2

(12) United States Patent
Onose et al.

(10) Patent No.: US 7,367,760 B2

(45) Date of Patent: May 6, 2008

(54) POWER TOOL

(75) Inventors: Akira Onose, Hitachinaka (JP); Hiroki Uchida, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 11/438,369

(22) Filed: May 23, 2006

(65) Prior Publication Data

US 2006/0269377 A1 Nov. 30, 2006

(30) Foreign Application Priority Data

May 24, 2005 (JP) .......................... P2005-151350

(51) Int. Cl.
*B23C 1/20* (2006.01)
*B23C 5/10* (2006.01)

(52) U.S. Cl. ...................... 409/182; 409/218; 409/210; 144/136.95

(58) Field of Classification Search ................ 409/181, 409/182, 204, 206, 185, 214, 210, 218; 144/136.95, 144/154.5; 81/121.1, 177.2, DIG. 5; 408/112, 408/241 S See application file for complete search history.

(56) References Cited

U.S. PATENT DOCUMENTS

| | | | | |
|---|---|---|---|---|
| 2,664,768 A | | 1/1954 | Clyne | |
| 4,281,694 A | * | 8/1981 | Gorman | 144/154.5 |
| 4,316,685 A | * | 2/1982 | George | 409/182 |
| 4,652,191 A | * | 3/1987 | Bernier | 409/182 |
| 4,770,573 A | * | 9/1988 | Monobe | 409/182 |
| 4,836,720 A | * | 6/1989 | Hadden | 408/112 |
| 4,938,264 A | * | 7/1990 | Ferenczffy | 144/154.5 |
| 4,938,642 A | * | 7/1990 | Imahashi et al. | 409/182 |
| 5,094,575 A | * | 3/1992 | Kieser et al. | 409/182 |
| 5,139,061 A | * | 8/1992 | Neilson | 144/135.2 |
| 5,143,494 A | * | 9/1992 | McCurry | 409/182 |
| 5,191,921 A | * | 3/1993 | McCurry | 144/154.5 |

(Continued)

FOREIGN PATENT DOCUMENTS

| | | |
|---|---|---|
| DE | 90 07 585 | 2/1993 |

(Continued)

*Primary Examiner*—Dana Ross

(74) *Attorney, Agent, or Firm*—Antonelli, Terry, Stout & Kraus, LLP.

(57) ABSTRACT

A power tool has a base, a main unit, a cutter, a bolt, an engagement member, and a unit. The base has a sliding surface slidable on a workpiece, another surface opposite to the sliding surface, and an opening in the base. The main unit is movable in a first direction substantially perpendicular to the sliding surface. The cutter is driven by a electric motor in the main unit to protrude through the opening from the sliding surface during an operation. The bolt extends in the first direction on the first side, a first male thread, and one end supported by the base. The bolt is rotatable about the longitudinal axis. The engagement member has a first female thread threadably engaged with the male thread. The engagement member is movable between an engaged position with the boot and a disengaged position therewith. The unit maintains the engagement member at the disengaged position in a second direction. The rotation of the bolt causes the first male thread portion to thread with respect to the first male thread portion, thereby moving the main unit in the first direction and adjusting a distance of the main unit to the sliding surface.

10 Claims, 30 Drawing Sheets

U.S. PATENT DOCUMENTS

| | | | | | |
|---|---|---|---|---|---|
| 5,207,253 | A | * | 5/1993 | Hoshino et al. | 144/136.95 |
| 5,247,846 | A | | 9/1993 | Grossmann et al. | |
| 5,308,201 | A | * | 5/1994 | Wilson et al. | 409/134 |
| 5,353,852 | A | * | 10/1994 | Stolzer et al. | 144/154.5 |
| 5,590,988 | A | * | 1/1997 | Rusconi | 409/182 |
| 5,590,989 | A | * | 1/1997 | Mulvihill | 409/182 |
| 5,671,789 | A | * | 9/1997 | Stolzer et al. | 144/154.5 |
| 5,685,676 | A | * | 11/1997 | Johnson | 409/182 |
| 5,725,036 | A | * | 3/1998 | Walter | 144/135.2 |
| 5,853,274 | A | * | 12/1998 | Coffey et al. | 409/182 |
| 5,918,652 | A | * | 7/1999 | Tucker | 144/371 |
| 5,988,241 | A | * | 11/1999 | Bosten et al. | 144/154.5 |
| 5,998,897 | A | * | 12/1999 | Bosten et al. | 310/89 |
| 6,065,912 | A | * | 5/2000 | Bosten et al. | 409/134 |
| 6,079,915 | A | * | 6/2000 | Bosten et al. | 409/182 |
| 6,113,323 | A | * | 9/2000 | Bosten et al. | 409/182 |
| 6,139,229 | A | * | 10/2000 | Bosten et al. | 409/182 |
| 6,237,657 | B1 | * | 5/2001 | Qian | 144/252.1 |
| RE37,247 | E | * | 6/2001 | Blickhan et al. | 409/137 |
| 6,261,036 | B1 | * | 7/2001 | Bosten et al. | 409/182 |
| 6,318,936 | B1 | * | 11/2001 | McFarlin et al. | 409/131 |
| 6,926,479 | B1 | * | 8/2005 | Taylor | 409/182 |
| 2004/0194854 | A1 | * | 10/2004 | McDonald et al. | 144/136.95 |

FOREIGN PATENT DOCUMENTS

| | | |
|---|---|---|
| JP | 02 069203 | 3/1990 |
| JP | 6-20726 | 3/1994 |

* cited by examiner

POWER TOOL

BACKGROUND OF THE INVENTION

1. Technical Field

The present invention relates to a power tool. More particularly, the invention relates to a router having a main unit movable with respect to a base to finely adjust a position of a cutter, thereby adjusting a depth of a groove to be cut in a workpiece. Further, the invention relates to a portable electric router in which a stopper pole is moved with respect to the main unit to move the main unit with respect to the base to adjust the depth of the groove to be cut in the workpiece.

2. Related Art

Electric power tools called routers have been well-known for cutting a groove in a workpiece. The router comprises a base, a main unit, a cutter, and a pair of handles. The base has a sliding surface on which a workpiece slides. The base has a through hole that extends perpendicularly to the sliding surface.

The main unit is supported on the opposite surface to the sliding surface of the base. The main unit can be moved with respect to the base in a direction perpendicular to the sliding surface. A workpiece is generally contact with the sliding surface in a horizontal position. Therefore, a moving direction of the main unit is usually a direction perpendicular to the sliding surface or a vertical direction. Hence, the main unit supported over the base can be usually moved up and down with respect to the base. The main unit has two through holes in which a pair of pillar-shaped members are inserted.

The two pillar-shaped members, called columns, support the main unit to the base. These pillar-shaped members are arranged parallel to each other, each extending perpendicularly to the sliding surface. The pillar-shaped members are fixed at one end to the base. The other end portions of the pillar-shaped members are inserted in the through holes. A fastening member is provided near the through hole in the main unit. The fastening member is designed to fasten one pillar-shaped member to the main unit temporarily to prevent the pillar-shaped member from moving with respect to the main unit. While fastened by the fastening member, the pillar-shaped member is temporarily held immovable.

The main unit has two projections which extend from left and right sides of the main unit, respectively, when the sliding surface extends horizontally, contacting with a workpiece. The router has the pair of handles which are mounted on the distal ends of the projections, respectively. A user may hold the handles with hands, respectively.

The main unit incorporates an electric motor. The electric motor has an output shaft that extends to the base in a direction perpendicular to the sliding surface. The cutter is attached and secured to the distal end of the output shaft. The cutter can move through the through hole of the base downward from the sliding surface, when the main unit is moved down to the base.

A method of cutting a groove in a workpiece by using the router will be described below. The fastening member is operated, thus releasing the pillar-shaped members from the main unit, allowing the main unit to move with respect to the both pillar-shaped members. The user holds the handles with hands, respectively, and then moves the main unit to a desired position with respect to the base. The user operates the fastening member to fix the pillar-shaped members to the main unit, making the main unit immovable with respect to the base. The cutter is then projected through the through holes to the workpiece by a desired distance from the sliding surface. The desired distance is the depth of a groove to be cut in the workpiece.

After setting the router in the above state, the user can hold the two handles with the hands, respectively, and move the router over the workpiece, contacting the sliding surface and maintaining the sliding surface in a substantially horizontal position. As a result, the cutter forms a groove in the workpiece because the cutter protrudes downward from the sliding surface. This type of router is disclosed in Japanese Patent Application Publication No. Hei 6-020726.

When using the conventional router described above, the user needs to hold the handles with the hands, respectively in order to support the main unit. The user then moves the main unit to a desired position with respect to the base, and protrudes the cutter by a desired distance to the workpiece from the sliding surface. Therefore, it is difficult to finely adjust the protruding distance of the cutter.

There is another method of using the router. In this method, a support member is secured to the router to support the router to an edge of a so-called router table. That is, the router is used with the base of the router being held upward in a vertical direction with respect to the main unit. The router is then supported at the edge of the router table by means of a support member. In this case, the user holds the handles with the hands, respectively, to move the main unit up and down in the vertical direction against the relatively large weight of the main unit to adjust the protruding distance of the cutter. Inevitably, it is more difficult to finely adjust the protruding distance of the cutter.

A router is proposed which has a fine-adjustment mechanism to finely adjust a moving distance of the main unit with respect to the base. In this case, the main unit needs to be moved first to a position near the desired position prior to the fine adjustment. The user must hold the handles with the hands, respectively to move the main unit. Hence, a mode of using the router need to be switched between the fine-adjusting mode in which the fine-adjustment mechanism adjusts the protruding distance of the cutter and the main-unit moving mode in which the user manually moves main unit to change the position of the main unit with respect to the base considerably. Further, if the user tries to operate the router in either one of the modes without holding the main unit, the user cannot easily move the main unit by handles, nor finely adjust the protruding distance of the cutter.

An object of this invention is to provide a power tool in which a moving distance of a main unit with respect to a base can be fine-adjusted, thereby fine-adjusting a protruding distance of a cutter from the base to a workpiece.

SUMMARY

The present invention provides a power tool having: a base, a main unit, a cutter, a bolt, an engagement member, and a unit. The base has a sliding surface slidable on a workpiece, another surface opposite to the sliding surface, and an opening provided through the base between the sliding surface and the another surface.

The main unit is supported on a first side of the another surface and movable in a first direction substantially perpendicular to the sliding surface, the main unit including an electric motor.

The cutter is driven by the electric motor to protrude through the opening from the sliding surface when the main unit is moved to the base.

The bolt has a longitudinal axis and extends in the first direction on the first side, a first male thread portion, and one end supported by the base. The bolt is rotatable about the longitudinal axis.

The engagement member has a first female thread portion threadably engaged with the male thread. The engagement member is movable between an engaged position and a disengaged position. The engaged position is a position at which the first male thread portion is engaged with the first female thread portion. The disengaged position is another position at which the first male thread portion is disengaged with the first female thread portion.

The unit maintains the engagement member at the disengaged position.

The present invention further provides a power tool having: a base, a main unit, a cutter, a bolt, and an engagement member.

The base has a sliding surface slidable on a workpiece, another surface opposite to the sliding surface, and an opening provided through the base between the sliding surface and the another surface,.

The main unit is supported on a first side of the another surface and movable in a first direction substantially perpendicular to the sliding surface. The main unit includes an electric motor.

The cutter is driven by the electric motor. The cutter is configured to protrude through the opening from the sliding surface.

The bolt has a longitudinal axis and extending in the first direction on the first side. The bolt has a first male thread portion and one end supported by the base. The bolt is rotatable about the longitudinal axis.

The engagement member is provided in the main unit and has a first female thread portion threadably engaged with the male thread. The engagement member is movable between an engaged position and a disengaged position. The engaged position is a position at which the first male thread portion is engaged with the first female thread portion. The disengaged position is another position at which the first male thread portion is disengaged with the first female thread portion.

when the engagement member is at the engaged position, rotation of the bolt causes the first male thread portion to thread with respect to the first female thread portion, thereby moving the main unit in the first direction and adjusting a distance of the main unit to the sliding surface. When the engaged member is at the disengaged position, the engaged member is maintained at the disengaged position without any external force.

BRIEF DESCRIPTION OF THE DRAWINGS

The aforementioned aspects and other features of the invention are explained in the following description, taken in connection with the accompanying drawing figures wherein.

DESCRIPTION OF THE EMBODIMENTS

A router according an embodiment of the present invention will be described with reference to FIGS. 1 to 34. The expressions "front", "rear", "above", "below", "left", and "right" are used throughout the description to define various parts when the rooter is disposed in an orientation in which it is intended to be used.

Figure 1:
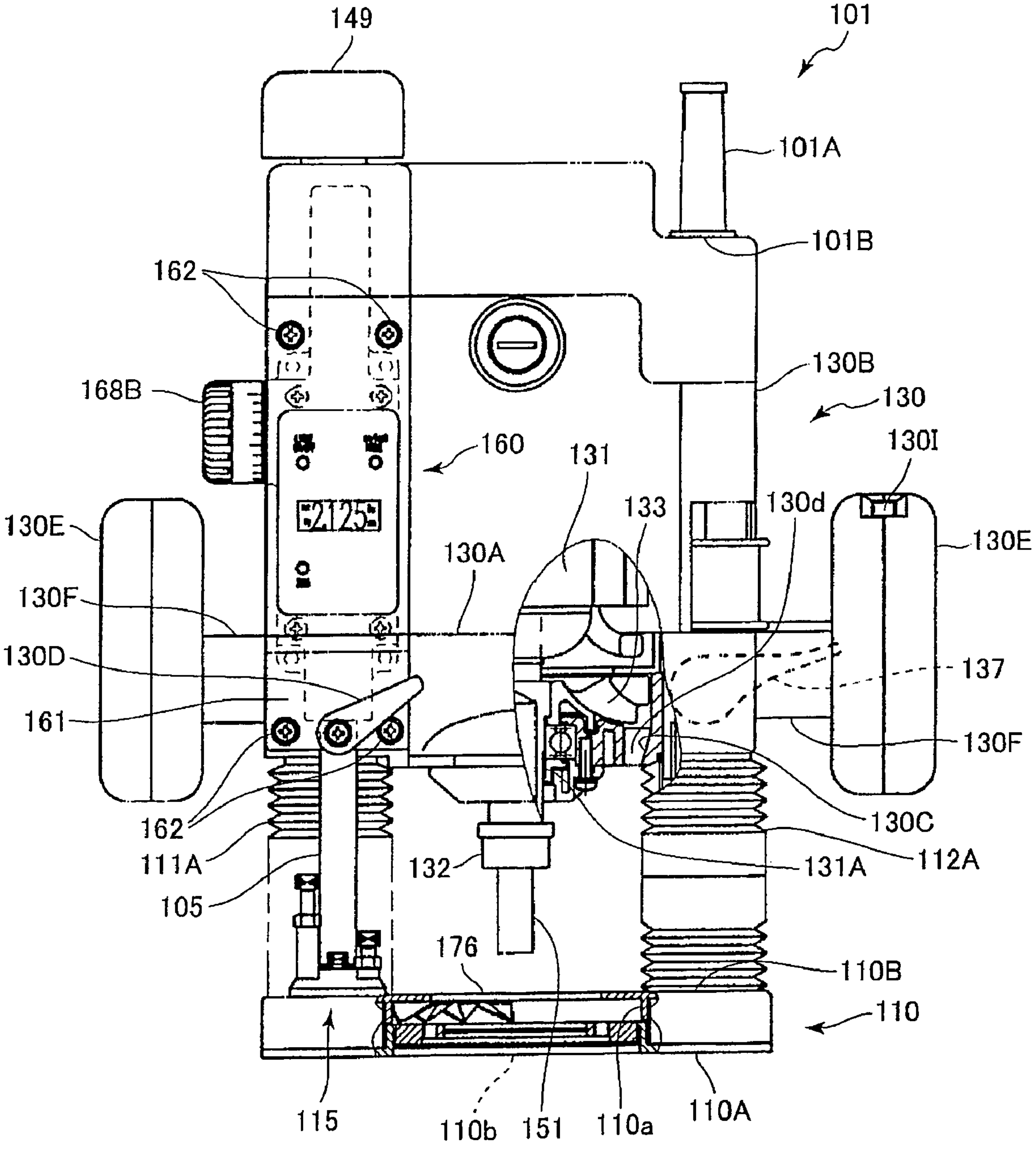
FIG. 1 is a partial sectional front view illustrating a router according to the present invention.

As FIG. 1 shows, a router 101 includes a base 110, a main unit 130 and a cutter 151. The base 110 has a prescribed thickness and has a surface 110A. The surface 110A is a sliding surface on which a workpiece (not shown) can slide. The base 110 has a recess 110*a* in the other surface 110B opposite to the sliding surface 110A. The recess 110*a* has a hollow cylindrical shape extending from the surface 110B to the surface 110A. The recess 110*a* can hold a dust guide 176 (which will be described later) and opens at the surface 110B.

A base-through hole 110*b* is made in a substantially center of the base 100 in an axial direction of the recess 110*a*. The base-through hole 110*b* extends between the surfaces 110A and 110B of the base 110 in a direction in which the surfaces 110A and 110B*a* are spaced. The diameter thereof is large enough to allow the passage of the cutter 151.

Figure 23:
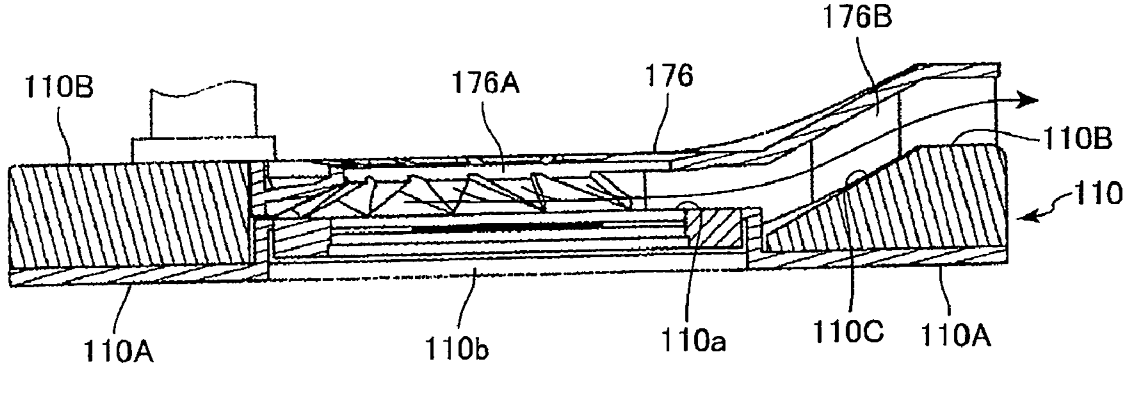
FIG. 23 is a sectional view showing the base.

The base 110 holds a dust guide 176, and opposes an outlet port 176B of the dust guide 176, and has an inclined surface 110C, as illustrated in FIG. 23. The inclined surface 110C inclines from the bottom of the recess of the dust-guide receptacle to the other surface 110B of the base 110, which faces away from the workpiece. As will be described later, chips can be removed from a space defined by an inner circumferential surface 176C of the dust guide 176 through the outlet port 176B to the other surface 110B.

Figure 19:
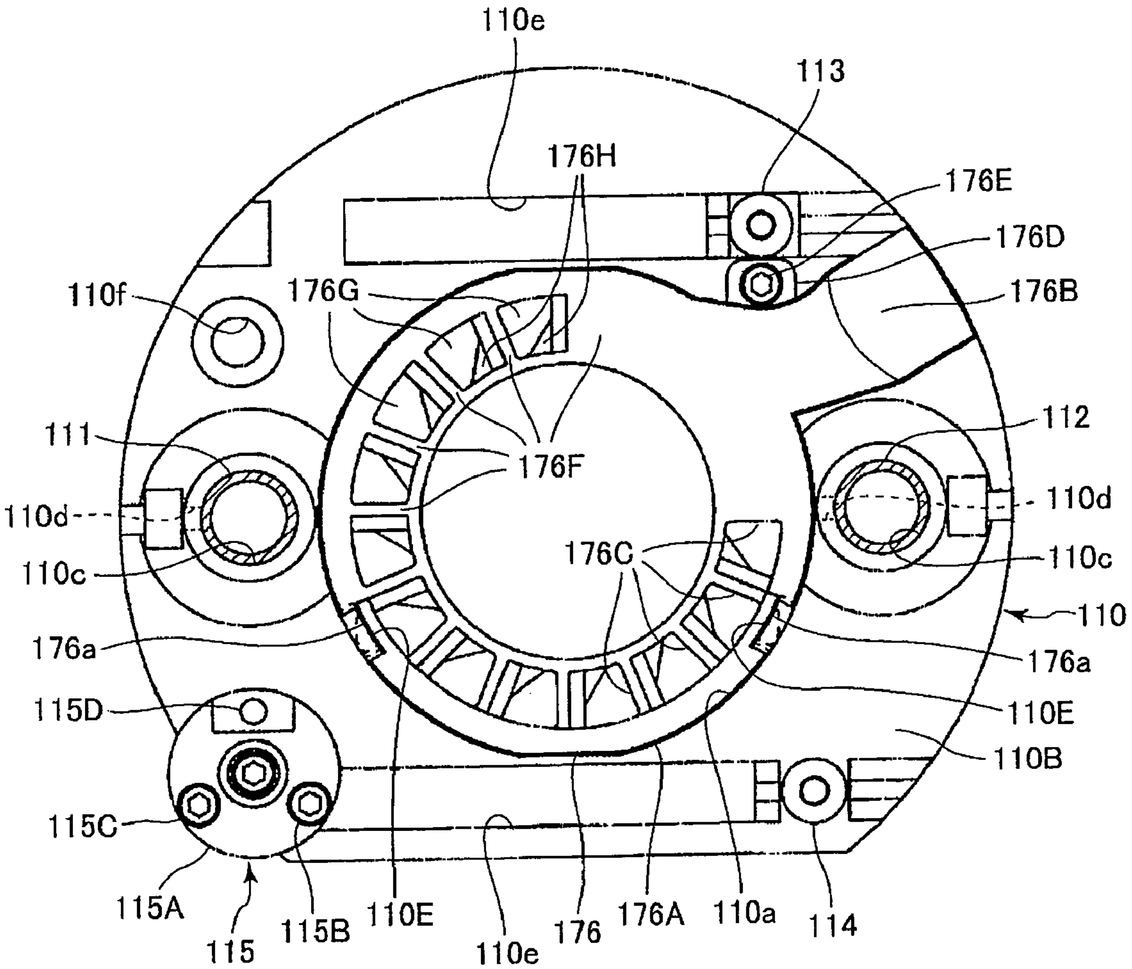
FIG. 19 is a plan view of the base.

As FIG. 19 shows, column-insertion recesses 110*c* are made in the other surface 110B. These recesses 110*c* are located outside the dust-guide receptacle. The column-insertion recesses 110*c* are shaped like a round pillar that has a predetermined depth, each extending from the surface 110B to the surface 110A. End parts of two hollow cylindrical columns 111 and 112 are inserted in the two column-insertion recesses 110*c*, respectively. The columns 111 and 112 are arranged parallel to each other. Each of the columns 111 and 112 has a shape of a round pillar.

Two pin-insertion holes 110*d* are made in the base 110, in which the column-insertion recesses 110*c* are made, and lie on the diameters of the column-insertion recesses 110*c* located close to the dust-guide receptacle. The pin-insertion holes 110*d* extend from the left and right sides of the base 110 (in FIG. 1 and/or 19) in the radial directions of the column-insertion recesses 110*c*. Two pins (not shown) are inserted in the pint-insertion holes 110*d*, respectively The pins (not shown) push one end of the columns 111 and 112 inserted in the column-insertion recesses 110*c* to either the left or the right. One ends of the two columns 111 and 112 are to the base 110, and immovable with respect to the base 110. The columns 111 and 112 vertically stand on the other surface of the base 110.

Two straight grooves 110*e* are cut in the base 110 on the both sides of the recess 110*a* (FIG. 1) and extend straight from the left to the right as shown in FIG. 19. The grooves 110*e* are parallel to each other. Fastening screws 113 and 114 are provided in the grooves 110*e* at prescribed positions, respectively. Two L-shaped guides, (not shown), each having a surface that may contact the workpiece, are inserted in the grooves 110*e* and fastened therein with the fastening screws 113 and 114, respectively. Thus, the router can cut a straight groove in the workpiece.

Figure 5:
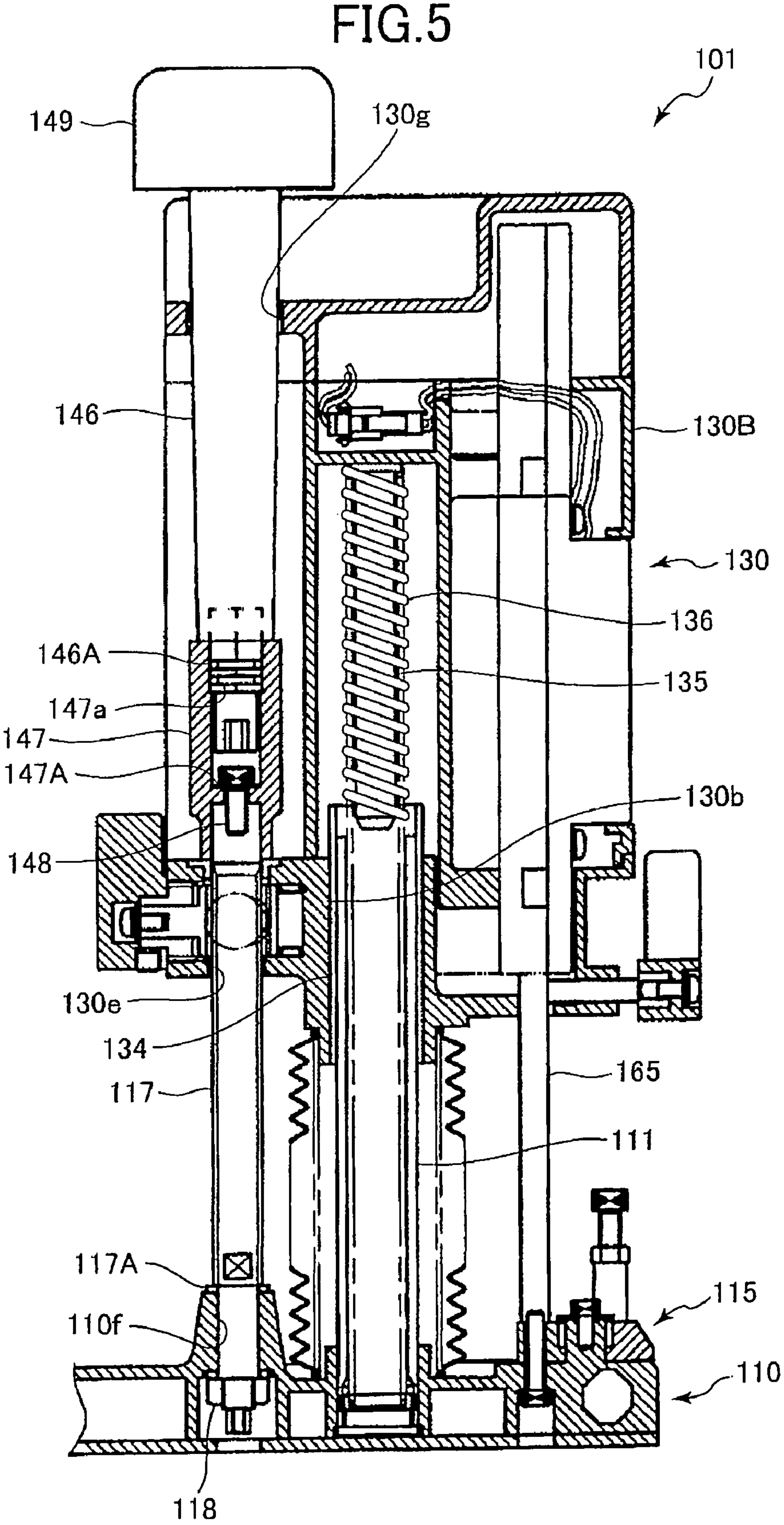
FIG. 5 is a sectional view showing the router.

The base 110 has a bolt hole 110*f*, in which a bolt 117 (later described) is inserted and held. The bolt hole 110*f* penetrates the base 110 in a line connecting the surface 110A of the base 110, and the other surface 110B of the base 110. As shown in FIG. 5, the bolt 117 has a stepped part 117A. One end portion of the bolt 117 shaped like a pillar is inserted in the bolt hole 110*f*, and the stepped part 117A abuts on the rim of the bolt hole 110*f*, which faces the main unit 130 that will be described later. A locknut 118 is mounted on that end portion of the bolt 117, which lies near the workpiece. Since the locknut 118 is set in screw engagement with the bolt 117, the bolt 117 is secured to the base 110 as illustrated in FIG. 5. The bolt 117 extends parallel to the columns 111 and 112 and vertically from the base 110.

Figure 4:
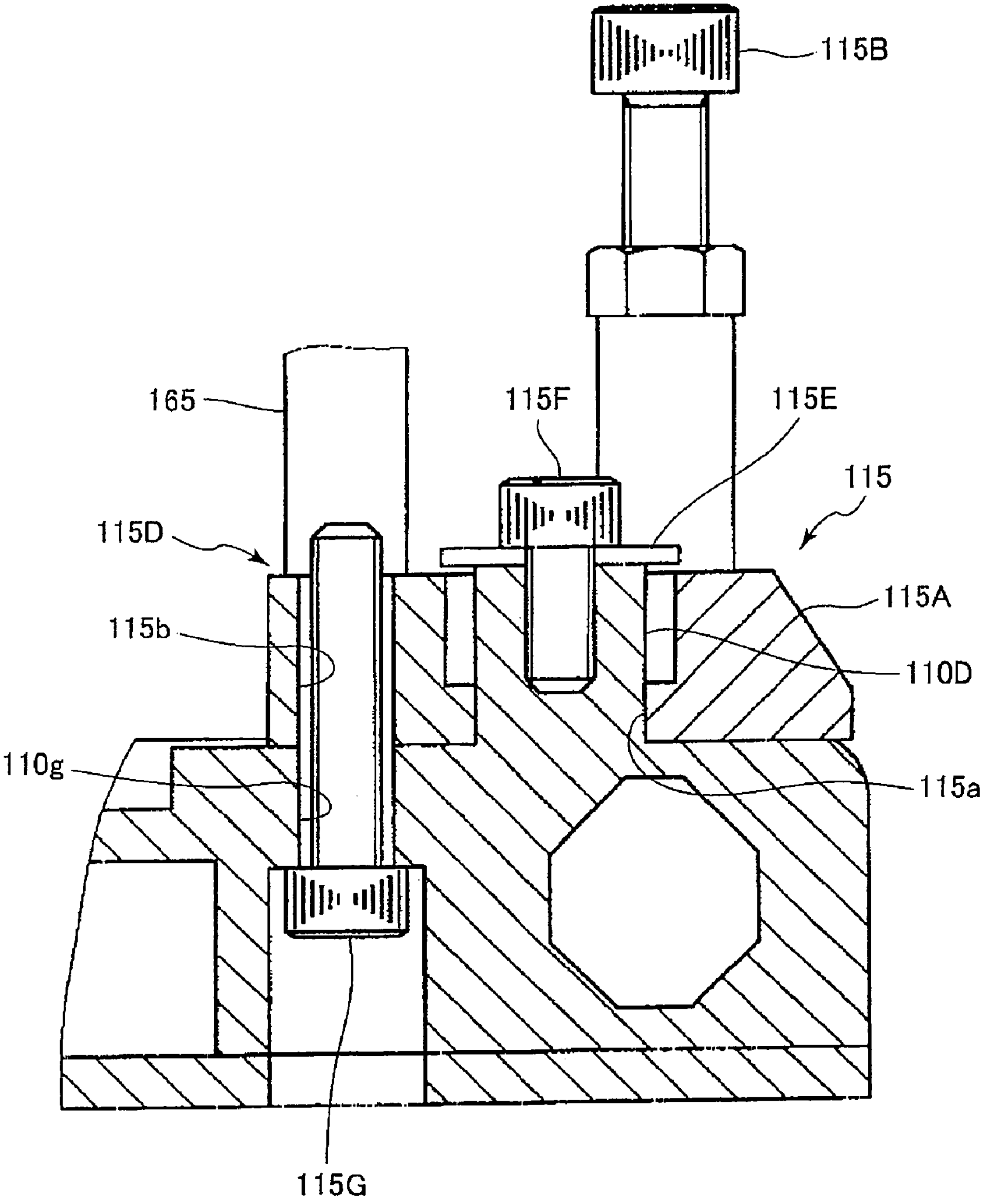
FIG. 4 is a sectional view depicting main parts of a stopper-pole position adjusting unit of the router.

A stopper-pole position adjusting mechanism 115 is provided on the base 110. A stopper pole 165 has one end which abuts on the adjusting mechanism 115. As shown in FIGS. 4 and 19, the stopper-pole position adjusting mechanism 115 includes a turntable section 115A, a plurality of projections 115B and 115C, and a fastening mechanism 115D. As FIG. 19 shows, the turntable section 115A has a substantially circular shape as viewed from the main unit 130 to the base 110. The section 115A is supported by the base 110 to rotate around an axis that is perpendicular to the surface 110A.

More specifically, the turntable section 115A has a through hole 115*a* shaped like a round pillar and extending along the axis as shown in FIG. 4. A projection 110D shaped like a round pillar and protruding from the base 110 toward the main unit 130 is inserted in the through hole 115*a*. On the distal end portion of the projection 110D, a washer 115E is mounted and a screw 115F is set in the projection 110D, lying coaxial with the projection 110D. The washer 115E makes a flange at the distal end of the projection 110D. The washer 115E abuts on the turntable section 115A, preventing the turntable section 115A from coming off the projection 110D.

The projections 115B and 115C are located about the turntable section 115A, respectively at positions of 120° and 240° in the counterclockwise direction from the position of 0°, i.e., the upper position in FIG. 19. The projections 115B and 115C vertically protrude from the turntable section 115A by different distances. The projections 115B and 115C have different lengths. The projections 115B and 115C have a male screw, respectively (not shown) When the projections 115B and 115C are turned, they move toward or away from the turntable section 115A.

With the stopper-pole position adjusting mechanism 115, the router 101 can cut a groove in the workpiece, first making a shallow groove, then deepening the groove step by step, and finally cutting a deep groove in the workpiece. If a relatively deep groove having a 60 mm depth is made, the electric motor 131 (later described) will be overloaded. Such a deep groove is difficult to be cut with a single cutting process. This is why a shallow groove should be made first, and then deepened step by step into a deeper groove.

In such a step-by-step cutting process, the user first adjusts the stopper pole 165, thrusting the cutter 151 by 60 mm from one surface 110A of the base 110, keeping the stopper pole 165 in abutment on the upper surface of the turntable section 115A. The user then turns the projection 115B, making the projection 115B protrude by 40 mm from the upper surface of the turntable section 115A, and turns the projection 115C, making the projection 115C protrude by 20 mm from the upper surface of the turntable section 115A.

Next, the user cuts a groove to a depth of 20 mm, while keeping the stopper pole 165 in contact with the projection 115B that protrudes by 40 mm. Subsequently, the user rotates the turntable section 115A and places the stopper pole 165 in abutment on the projection 115C that protrudes by 20 mm. In this condition, the user performs cutting, increasing the depth of the groove from 20 mm to 40 mm. A groove that is 40 mm deep is thereby made in the workpiece. Next, the user turns the turntable section 115A and brings the stopper pole 165 into contact with the upper surface of the turntable section 115A. Then, the user performs cutting, increasing the depth of the groove from 40 mm to 60 mm. As a result, the router can cut a 60-mm deep groove in the workpiece.

As indicated above, the lower end of the stopper pole 165 abuts on the stopper-pole position adjusting mechanism 115 that has projections 115B and 115C protruding by different distances from the upper surface of the turntable section 115A. Hence, a deep groove can be easily cut in the workpiece, by cutting the workpiece step by step.

The fastening mechanism 115D is located around the turntable section 115A, at position of 0°, i.e., the upper position in FIG. 19. As shown in FIG. 4, the fastening mechanism 115D has a fastening-part through hole 110*g*, a turntable-fastening through hole 115*b*, and a male screw 115G. The fastening-part through hole 110*g* extends through the base 110, opening at one surface 110A and other surface 110B of the base 110. The turntable-fastening through hole 115*b* extends through the turntable section 115A, in parallel to the fastening-part through hole 110*g*. One end portion of the stopper pole 165 (later described) has a second female screw cut in the inner circumferential surface thereof.

The male screw 115G is inserted from the surface 110A of the base 110 through the fastening-part through hole 110*g* to the turntable-fastening through hole 115*b*. Accordingly, the male screw 115G is set in screw engagement with the second female screw cut in one end of the stopper pole 165 at the other surface 110B of the base 110. The stopper pole 165 is therefore fixed to the base 110 and held at the base 110. The moving distance of the stopper pole 165 with respect, to the main unit 130 and the moving distance of the base 110 with respect to the main unit 130 can be detected, as will be described later.

As FIG. 19 shows, two claws 110E are provided on the inner circumferential surface of the opening made in the dust-guide receptacle The claws 110E are located around the inner circumferential surface of the opening, respectively at positions of 120° and 240° in the clockwise direction from the position of 0°, i.e., the upper position in FIG. 19.

The other surface 110B of the base 110, i e., the surface facing away from the workpiece, has a female-screw hole (not shown) in which a dust-guide fastening screw 176E is set in engagement as illustrated in FIG. 19. The dust-guide fastening screw 176E extends through a through hole 176*b* made in the projection 176D that is provided on the dust guide 176. The dust-guide fastening screw 176E is set in screw engagement with the female-screw hole (not shown). Therefore, the dust guide 176 is secured to the base 110, while being held in the dust-guide receptacle.

Figure 2:
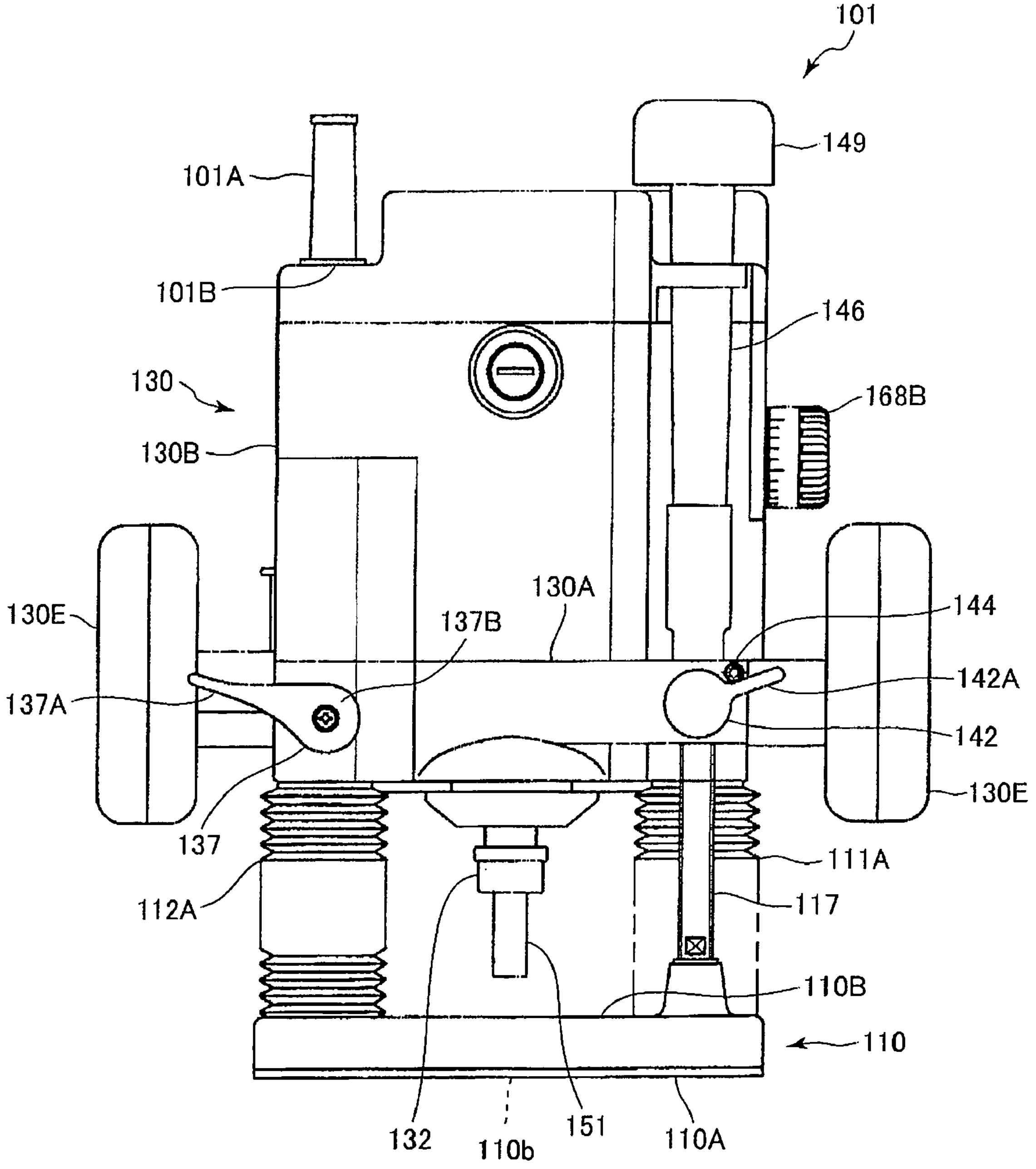
FIG. 2 is a back view showing the router.

As seen from FIGS. 1 and 2, the two columns 111 and 112 have their outer circumferential surfaces protected by protective members 111A and 112A, respectively. The columns 111 and 112 are inserted, at the other end, in through holes 130*b* and 130*c* made in the main unit 130 as will be described later. The main unit 130 can therefore slide with respect to the columns 111 and 112 (see FIG. 3). Hence, the main unit 130 can move in the vertical direction, or up and down in FIG. 1, with respect to one surface 110A of the base 110, i.e., the sliding surface.

The main unit 130 supports the output shaft 131A of the electric motor 131. The shaft 131A of the electric motor 131 may change in position due to deformation to reduce the cutting precision. To prevent such reduction of the cutting precision, the lower part of the main unit 130 (FIG. 1) which supports the electric motor 131 is a conductive casing 130A that is made of electrically conductive material, such as metal of high hardness (e.g., aluminum) The upper part of the main unit 130 show in FIG. 1 is a casing 130B that is made of resin.

In the main unit 130, the electric motor 131 is located almost halfway between the left and right sides of the main unit 130. The output shaft 131A (motor shaft) extends from the electric motor 131 downward (in FIG. 1), namely toward the base 110 in the direction perpendicular to one surface 110A, i.e., the sliding surface. As shown in FIG. 1, a collet chuck 132 attaches the cutter (bit) 151 to the lower end of the output shaft 131A. Note that the cutter 151 can be removed from the output shaft 131A.

The cutter 151 is driven and rotated by the electric motor 131. As the main unit 130 is moved down to approach the base 110, the cutter 151 can project from one surface 110A of the base 110, i.e., the sliding surface, through the base-through hole 110*b*. Thus, the cutter 151 extending from the base-through hole 110*b* can bite the workpiece to cut a groove in the workpiece, as the base 110 slides on the workpiece at the sliding surface. As FIG. 1 shows, a centrifugal fan 133 is arranged coaxialy with the output shaft 131A of the electric motor 131. The fan 133 is designed to apply air from the main unit 130 to the base 110.

Figure 3:
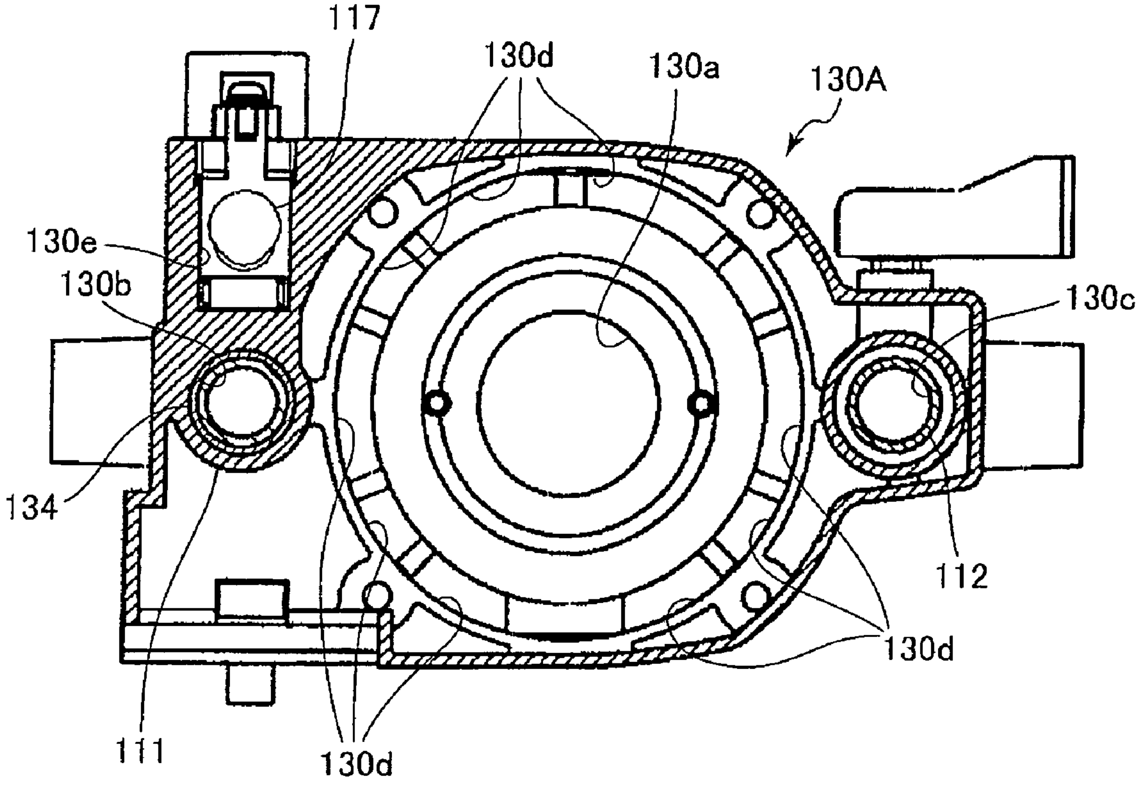
FIG. 3 is a sectional view showing main parts of an electrically conductive casing section of the router.

The electric motor 131 is located, almost halfway between the left and right sides of the electrically conductive casing 130A that constitutes the main unit 130, as illustrated in FIG. 3. As FIG. 3 shows, the electrically conductive casing 130A has a through hole 130*a* in the substantially center part. This hole 130*a* exposes the collet chuck 132 to the outside. The casing 130A has two through holes 130*b* and 130*c*, which are located at the left and right sides of the electric motor 131. The columns 111 and 112 are inserted in these through holes 130*b* and 130*c*, respectively, and can slide with respect to the electrically conductive casing 130A. The casing 130A further has a bolt-insertion through hole 130*e* in which the bolt 117 is inserted.

As FIGS. 1 and 3 show, the electrically conductive casing 130A has an annular through hole 130*d* that is coaxial with the through hole 130*a*. Through the annular through hole 130*d*, fan air can be passed from the fan to the base 110. As FIG. 1 shows, the main unit 130 has an inclined surface 130C that inclines toward the base-through hole 110*b*. The inclined surface 130C prevents fan air from flowing from the left and right sides of the router 101 before the air flows to the base 110. The annular through hole 130*d* corresponds to a fan-air outlet port.

The two columns 111 and 112 have the same outside diameter. By contrast, the through holes 130*b* and 130*c* do not have the same diameter. As shown in FIG. 3, the right through hole 130*c* has a diameter a little larger than that of the left through hole 130*b*. Hence, the difference between the diameter of the through hole 130*c* and the outside diameter of the column 112 inserted in the hole 130*c* is larger than the difference between the diameter of the other through hole 130*b* and the outside diameter of the other column 111 inserted in the hole 130*b*. Further, as shown in FIG. 5, an annular member 134 is pushed in the through hole 130*b*. The annular member 134 has an inside diameter that is nearly equal to the outside diameter of the column 111. Therefore, the through hole 130*b* positions the column 111 more precisely than the other through hole 130*c* positions the column 112.

As illustrated in FIG. 5, two small-diameter columns 135 are provided in the main unit 130. These columns 135 are arranged between the other ends of the columns 111 and 112 and a part of the casing 130B made of resin, and have an outside diameter smaller than the inside diameter of the columns 111 and 112. The small-diameter columns 135 are secured at one end to the casing 130B made of resin, have their other ends inserted in the columns 111 and 112, respectively, and can slide in the columns 111 and 112. In FIG. 5, only one of the small-diameter columns 135 is illustrated.

A compression spring 136 is wound around the outer circumferential surface of each small-diameter column 135. The compression spring 136 abuts at one end on the casing made of resin, and at the other end on the step defined by the other end of the column 111 or 112 and the inner circumferential surface of the annular member 134. Both compression springs 136 are always biased to move the main unit 130 away from the base 110.

As FIG. 2 shows, a lock lever 137 is provided on the electrically conductive casing at the back of the main unit 130 and can be rotated. The lock lever 137 includes a knob part 137A and a shaft part 137B. The shaft part 137B has a male screw (not shown) and is set in a lock-lever through hole (not shown) made in the electrically conductive casing 130A. The lock lever 137 is screwed with the lock-lever through hole formed in the electrically conductive casing 130A, communicated with the other through hole 130*c* of the main unit, and having a female screw on the inner circumferential surface. The shaft part 137B can be pushed to abut the distal end thereof on the column 112.

When the lock lever 137 is rotated, the shaft part 137B is pushed, at the distal end thereof, on the column 112. Then, the main unit 130 is secured to the column 112. When the lock lever 137 is rotated in the opposite direction, the distal end of the shaft part 137B is spaced from the outer circumferential surface of the column 112. In this case, the main unit 130 is released from the engagement with the column 112.

As FIG. 5 shows, the other end of the bolt 117 vertically projecting from the base 110, extends through the bolt-insertion through hole 130*e* of the main unit 130. As FIGS. 6 to 9 show, a male screw 117B is provided on the outer circumferential surface of the bolt 117 that lies in the bolt-insertion through hole 130*e*. The inside diameter of the bolt-insertion through hole 130*e* gradually increases in the axial direction of the bolt 117. An engagement member 138 shaped like a rectangular solid and a drive member 139 are provided in the through hole 130*e*. The engagement member 138 can move in the axial direction of the bolt 117, because the bolt-insertion through hole 130*e* has a large space. The bolt-insertion through hole 130*e*, which has a large space, opens to the back of the main unit 130.

Figure 7:
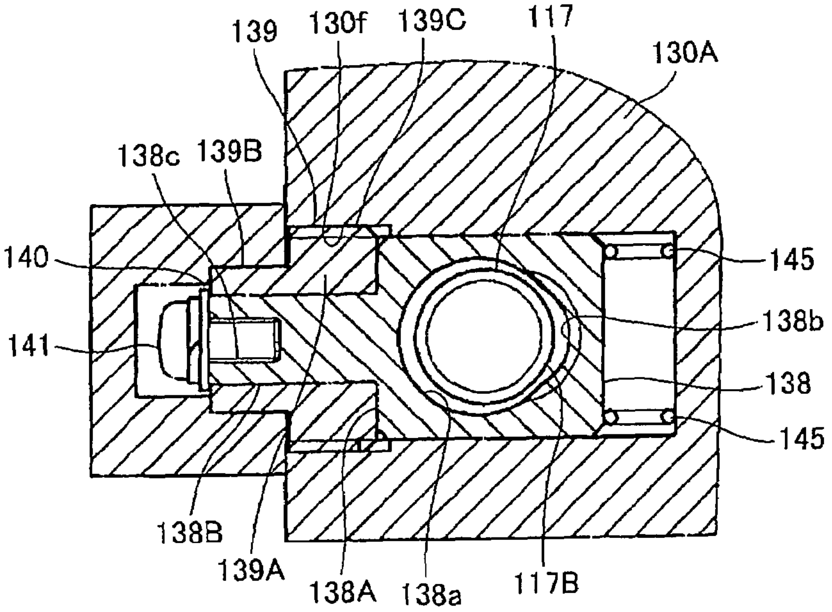
Figure 8:
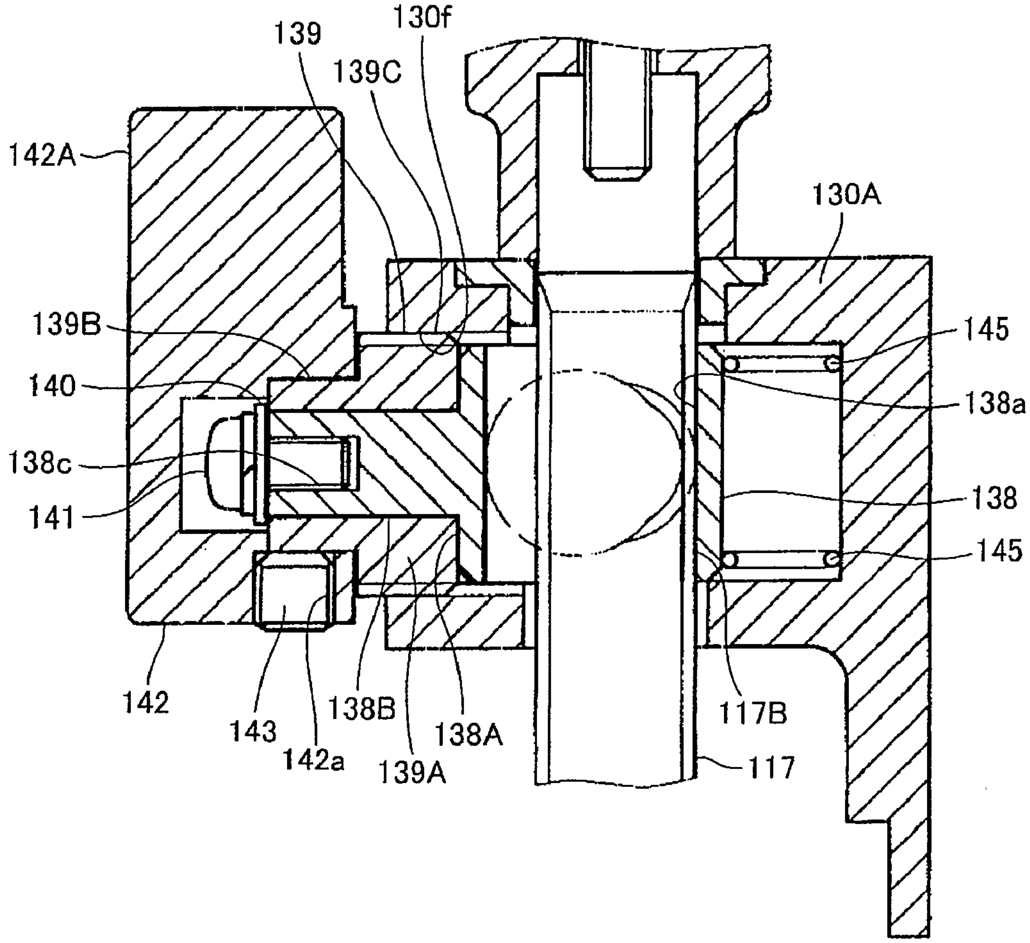
FIGS. 8 and 9 are partial sectional views showing the router, showing that the engagement member is at an engaged position.
Figure 9:
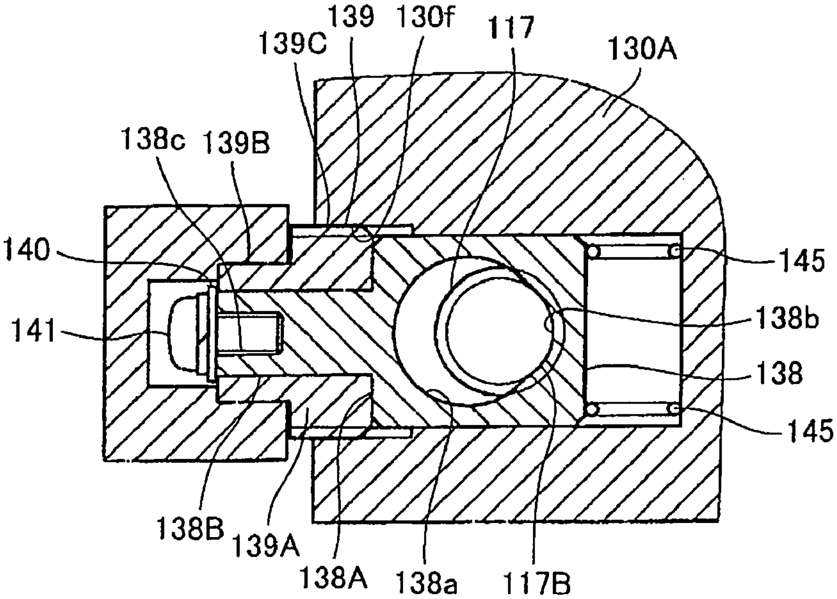

A bolt-insertion through hole 138*a* shaped like a round pillar is made in substantially the center part of the engagement member 138. This bolt-insertion through hole 138*a* has a diameter larger than the outside diameter of the bolt 117. An arcuate recess 138*b* is formed in the inner circumferential surface of the bolt-insertion through hole 138*a* and is located on the right (in FIG. 7). A female thread is formed in the recess 138*b*. This female thread can mesh with the male thread 117B of the bolt 117. The position where the male thread 117B of the bolt 117 meshes with the female thread in the recess 138*b* is an engaged position, as illustrated in FIG. 9. The position where male thread 117B comes out of mesh with the female thread is a disengaged position, as depicted in FIG. 7. The engagement member 138 can move between the engaged position and the disengaged position.

An engagement projection 138B shaped like a round pillar protrudes from the outer circumferential surface 138A of the engagement member 138. The engagement projection 138B extends from the outer circumferential surface 138A of the engagement member 138 to the back of the main unit 130, i.e., to the left in FIG. 6. The drive member 139 is mounted on the circumferential surface of the engagement projection 138B and positioned coaxial with the engagement projection 138B to rotate about the axis of the engagement projection 138B. The drive member 139 has a large-diameter part 139A that is close to the outer circumferential surface 138A of the engagement member 138. A male thread 139C is formed in the outer circumferential surface of the large-diameter part 139A. The large-diameter part 139A of the drive member 139 lies in the bolt-insertion through hole 130*e*. The drive member 139 has a small-diameter part 139B, which lies on the front of the large-diameter part 139A, projects from the back of the main unit 130.

A recess 138*c* is made in the distal end of the engagement projection 138B. A screw 141 is inserted in the recess 138*c* in screw engagement. A washer 140 is mounted on the screw 141, laid on the distal end of the engagement projection 138B and extends in the radial direction of the engagement projection 138B like a flange. The small-diameter part 139B of the drive member 139 abuts on the washer 140. The large-diameter part 139A of the driven member 139 abuts on the outer circumferential surface 138A of the engagement member 138. The distal end of the engagement projection 138B is in flush with the small-diameter part 139B of the drive member 139. The drive member 139 is held between the washer 140 and the outer circumferential surface 138A of the engagement member 138.

A female thread 130*f* is formed in that inner surface of the bolt-insertion through hole 130*e* or in the main unit 130 which opposes the male thread 139C of the large-diameter part 139A. The female screw 130*f* meshes with the male thread 139C of the large-diameter part 139A of the drive member 139. When the drive member 139 rotates around the engagement projection 138B, the drive member 139 moves toward or far from the central axis of the bolt 117.

Figure 6:
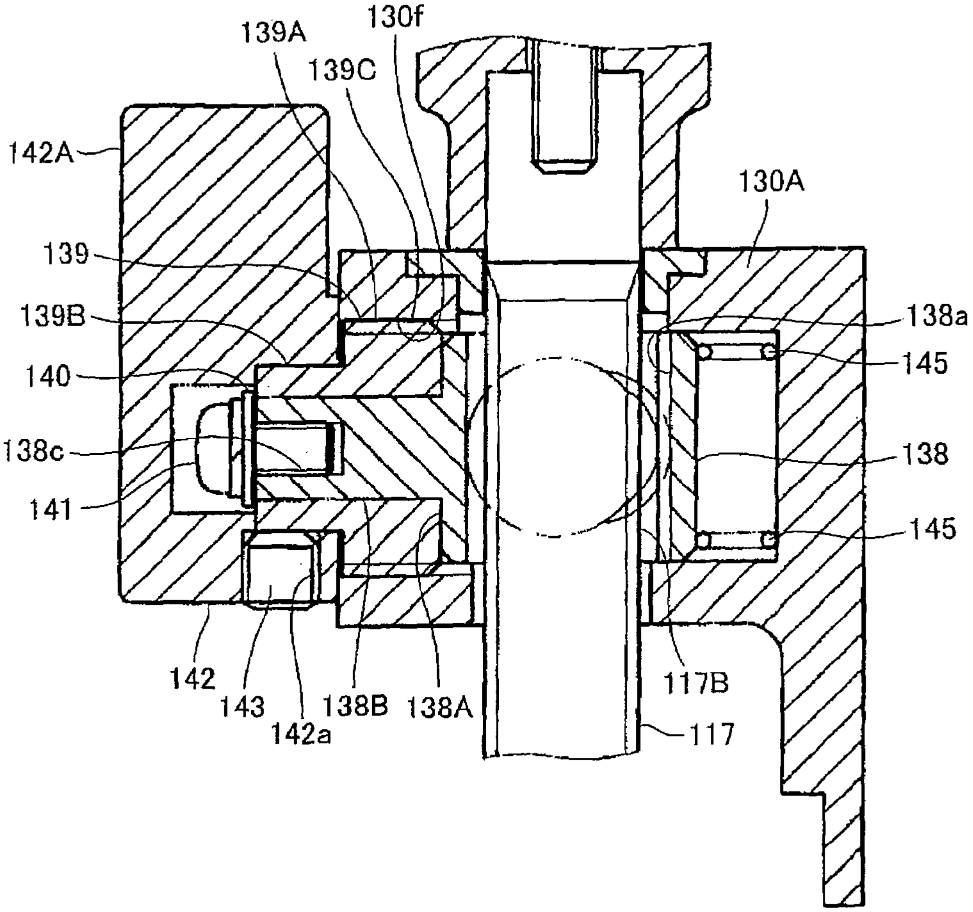
FIGS. 6 and 7 are partial sectional views showing the router, illustrating that an engagement member is positioned at a disengaged position.

A lever member 142 is mounted on the small-diameter part 139B of the drive member 139. As illustrated in FIG. 6, the lever member 142 has a projection 142A that protrudes in a direction perpendicular to the axis of the drive member s 139. The junction between the small-diameter part 139B of the drive member 139 and the lever member 142 mounted on the small-diameter part 139B constitutes a coupling section that couples the lever member 142 and the drive member 139. The coupling section has a recess 142*a* shaped like a round pillar. The recess 142*a* has a female thread formed in the inner circumferential surface thereof. A headless screw 143 having a hexagonal recess in the top is set in mesh with the recess 142*a*. As the headless screw 143 is turned, the screw 143 pushes the drive member 139 and the lever member 142, holding the lever member 142 firmly and disabling the lever member 142 to rotate with respect to the drive member 139.

When the lever member 142 is held and unable to rotate with respect to the drive member 139, the user may hold and rotate the projection 142A to move the engagement member 138. In this case, the drive member 139 is rotated to move in the direction perpendicular to the axis of the bolt 117. As a result, the engagement member 138 is moved to the engaged position where the female thread provided in the recess 138*b* meshes with the male thread 117B of the bolt 117. Alternatively, the engagement member 138 is moved to the disengaged position where the female thread in the recess 138*b* of the engagement member 138 comes out of mesh with the male thread 117B of the bolt 117.

The drive member 139 is rotated to move the engagement member 138 from the engaged position to the disengaged position, or from the disengaged position to the engaged position. Thus, the engagement member 138 remains at the disengaged position unless the drive member 139 is rotated at the disengaged position.

As shown in FIG. 2, a rotation-restricting member 144 protrudes from the back of the main unit 130. The rotation-restricting member 144 is provided in the region where the projection 142A of the lever member 142 can rotate,. When the projection 142A is rotated to abut on the rotation-restricting member 144, the projection 142A cannot be rotated any more. Thus, the member 144 restricts the rotation of the lever member 142.

The headless screw 143 is turned to move far from the engagement member 138 backwards, enabling the lever member 142 to rotate with respect to the drive member 139. The lever member 142 is rotated, adjusting the angle of rotation. Then, the headless screw 143 is turned and moved to the engagement member 138, disabling the lever member 142 from being rotated with respect to the drive member 139. Thus, the engagement member 138 can be at the engaged position when the projection 142A of the lever member 142 abuts on the rotation-restricting member 144. Alternatively, the engagement member 138 can be at the disengaged position when the projection 142A abuts on the rotation-restricting member 144.

The headless screw 143 is turned and moved backwards, enabling the lever member 142 to be rotated with respect to the drive member 139. The lever member 142 is rotated, adjusting the angle of rotation minutely. Then, the headless screw 143 is turned and moved forward, disabling the lever member 142 from being rotated with respect to the drive member 139. In this case, the meshing of the female thread provided in the recess 138*b* of the engagement member 138 with the male thread 117B of the bolt 117 can be adjusted finely if the engagement member 138 is at the engaged position when the projection 142A of the lever member 142 abuts on the rotation-restricting member 144. Thus, the female thread can mesh with the male thread 117B in a proper manner.

As FIGS. 6 to 9 show, a compression spring 145 is provided in the bolt-insertion through hole 130*e* at a position remote from the engagement projection 138B. As shown in FIGS. 6 to 9, the compression spring 145 has one end contacting a part of the main unit 130 in which the bolt-insertion through hole 130*e* is made, and the other end abutting on the engagement member 138. The compression spring 145 therefore always biases the engagement member 138 to the back of the main unit 130. Hence, the male thread 139C of the drive member 139 is pushed to be engaged with the female thread 130*f* in the moving direction of the drive member 139. As a result, no play occurs between the male thread and the female thread, and the lever member 142 has no play at all.

As FIG. 5 shows, a hollow cylindrical shaft 146 is provided above the bolt 117 or at the other end of the bolt 117. The shaft 146 is coaxially connected to the bolt 117 by a connecting member 147. The connecting member 147 is shaped like a hollow cylinder. A wall 147A is provided in the connecting member 147, dividing the interior of the member 147 into two spaces. The wall 147A has a through hole. A female thread is provided in the circumferential surface of this through hole and is in mesh with a male screw 148. The male screw 148 is in turn mesh with a female thread formed in the inner circumferential surface of the other end of the bolt 117. The connecting member 147 is therefore coupled to the bolt 117 such that the member 147 and the bolt 117 can be rotated together.

As FIG. 5 shows, the shaft 146 is inserted in an insertion hole 130*g* shaped like a round pillar, made in the resin casing 130B and extending parallel to the axes of the columns 111 and 112. The shaft 146 has a male thread 146A formed in the circumferential surface of one end. The connection member 147 has a male thread 147*a* that is formed in the inner circumferential surface of one end. The male thread 146A is set in mesh with the female thread 147*a*. Therefore, the shaft 146 and the connecting member 147 are coupled to each other to rotate together. In addition, the connection member 147 is coupled to the bolt 117 to rotate together with the bolt 117 as described above. Hence, the bolt 117 is rotated when the shaft 146 is rotated.

A fine-adjustment knob 149 is fastened to the other end of the shaft coupled to the connecting member 147. The fine-adjustment knob 149 has a round cross section taken along a plane perpendicular to the axis of the shaft 146. The fine-adjustment knob 149 has a radius greater than that of the shaft 146. Hence, the bolt 117 can be rotated by the same angle as the rotating angle of the fine-adjustment knob 149. When the bolt 117 is rotated, the engagement member 138 is moved toward or away from the male thread 117B of the bolt 117. In the bolt-insertion through hole 130*e*, the engagement member 138 cannot move in the axial direction of the bolt 117. Therefore, the main unit 130 can be moved upward or downward, together with the engagement member 138 in the axial direction of the bolt 117, as the engagement member 138 is moved upward or downward.

Figure 10:
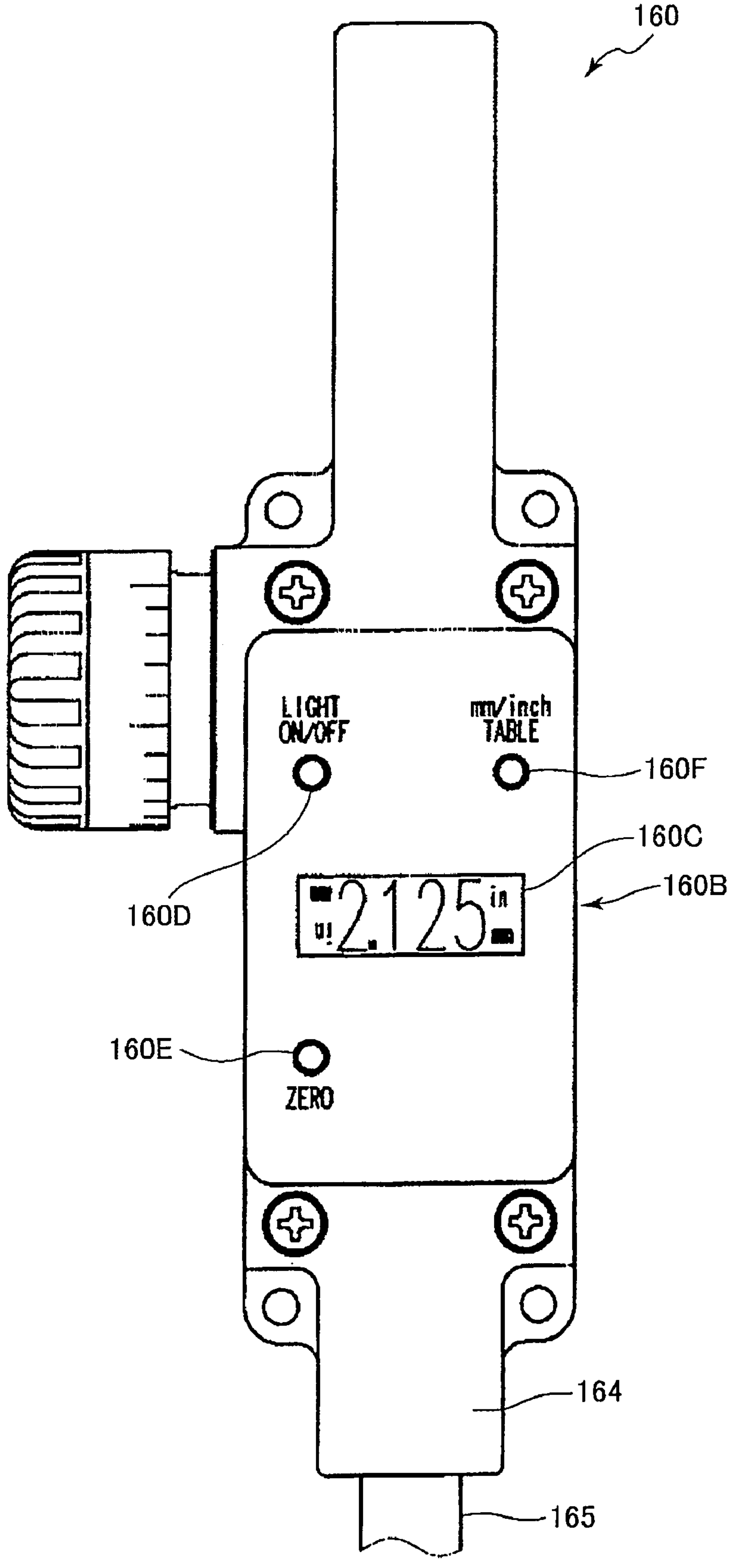
FIG. 10 is a front view illustrating a digital display unit provided in the router.

As shown in FIG. 10, a digital display unit 160 incorporating the stopper pole 165 is provided on a part of the main unit 130 in which the other column 111 is arranged. As FIG. 1 shows, the digital display unit 160 is surrounded by a cover 161 that is secured to the main unit 130 with screws 162.

The digital display unit 160 has housings 163 and 164 (FIG. 14) that are coupled to form one housing unit. The stopper pole 165, which is shaped like a rectangular plate, is inserted in the housing unit and movably supported by the housing unit. As the digital display unit 160 is fastened to the main unit 130, the stopper pole 165 extends in a direction parallel to the columns 111 and 112 and the bolt 117. The stopper pole 165 can move in this direction, with respect to the main unit 130 or the base 110, as will be described later.

Figure 14:
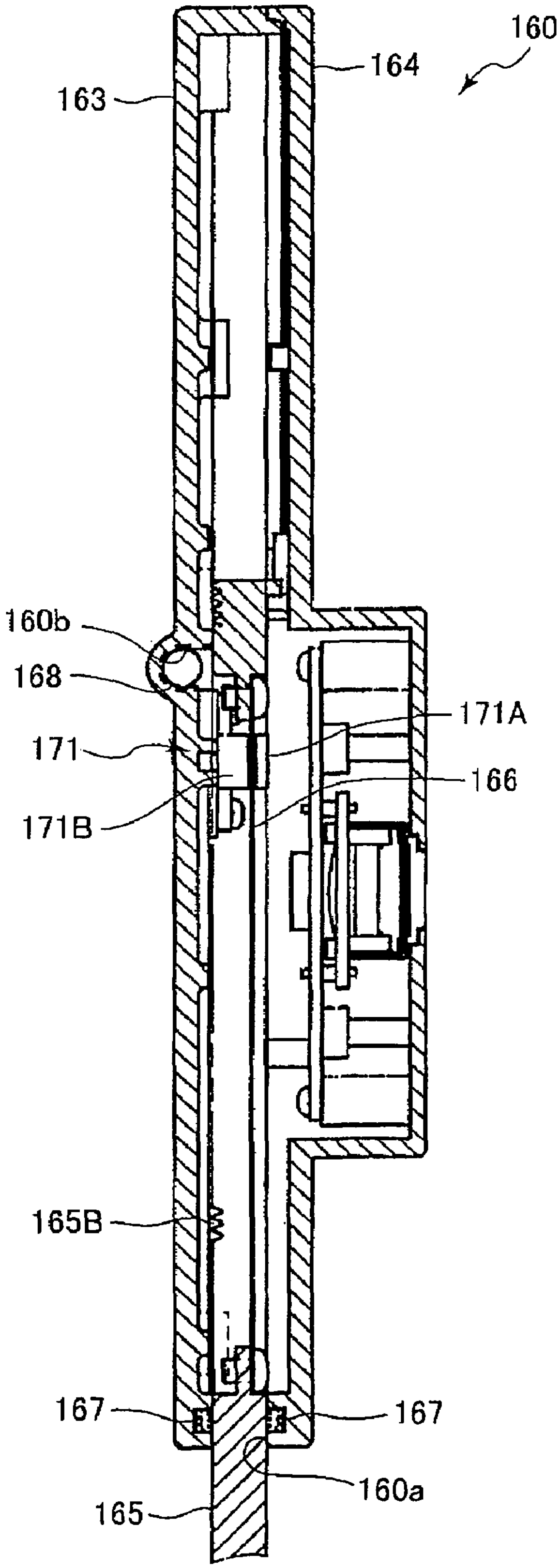
FIG. 14 is a sectional side view showing the digital display unit.
Figure 15:
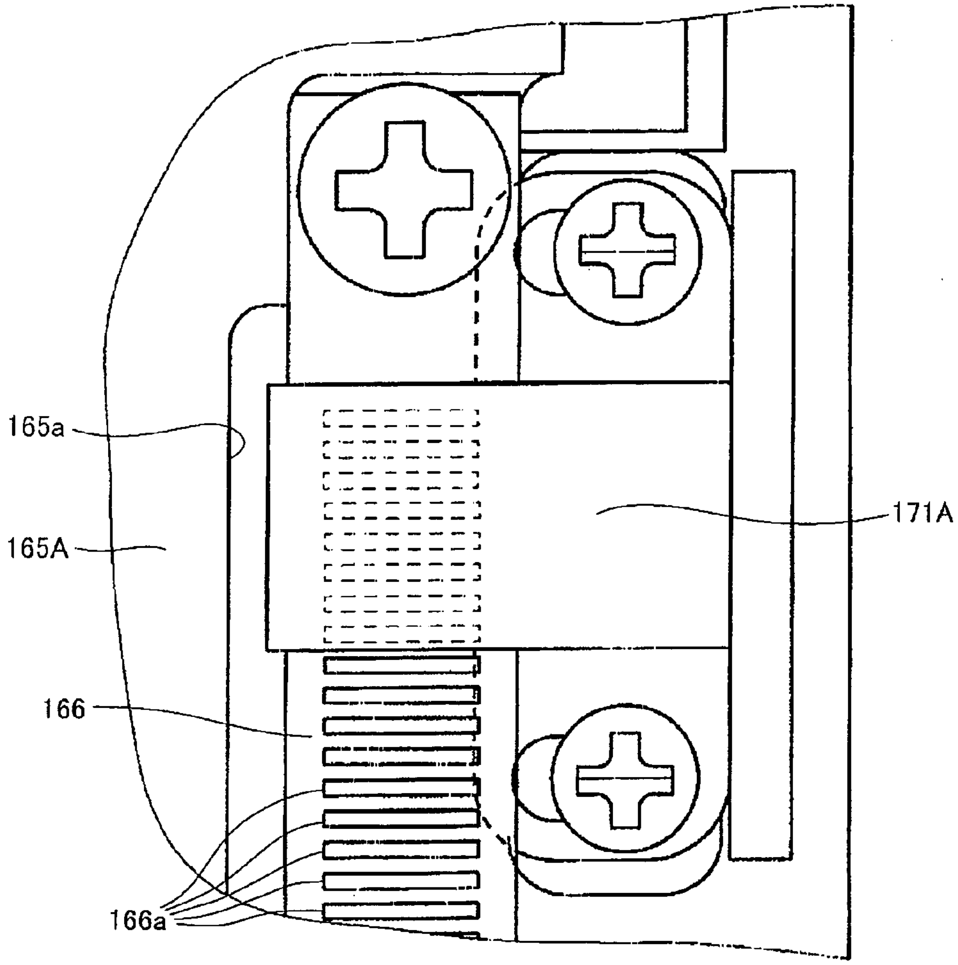
FIG. 15 is an enlarged view of the tape provided on the digital display unit.

As illustrated in FIG. 14, the housings 163 and 164 have a communication hole 160*a* that communicates the interior of the housings 163 and 164 to the exterior thereof. The communication hole 160*a* is made at a part of the housings 163 and 164 opposing the base 110 when the digital display unit 160 is fastened to the main unit 130. The hole 160*a* opens toward the base 110. The stopper pole 165 protrudes outside from the housings 163 and 164 through the communication hole 160*a*. The stopper pole 165 can move to protrude from the communication hole 160*a* toward the base 110 by a predetermined distance.

A tape 166 having slits of precise dimensions and a detection unit 171 designed to detect the slit are provided in the housings 163 and 164. The joint portion between the housings 163 and 164 is sealed with a seal member (not shown). This structure prevents dust from entering into the housings 163 and 164. Dust is required to be prevented from entering at the communication hole 160*a*. To this end, a felt member 167 is provided in the communication hole 160*a* and contacts the stopper pole 165, thus preventing dust from entering the interior.

Figure 11:
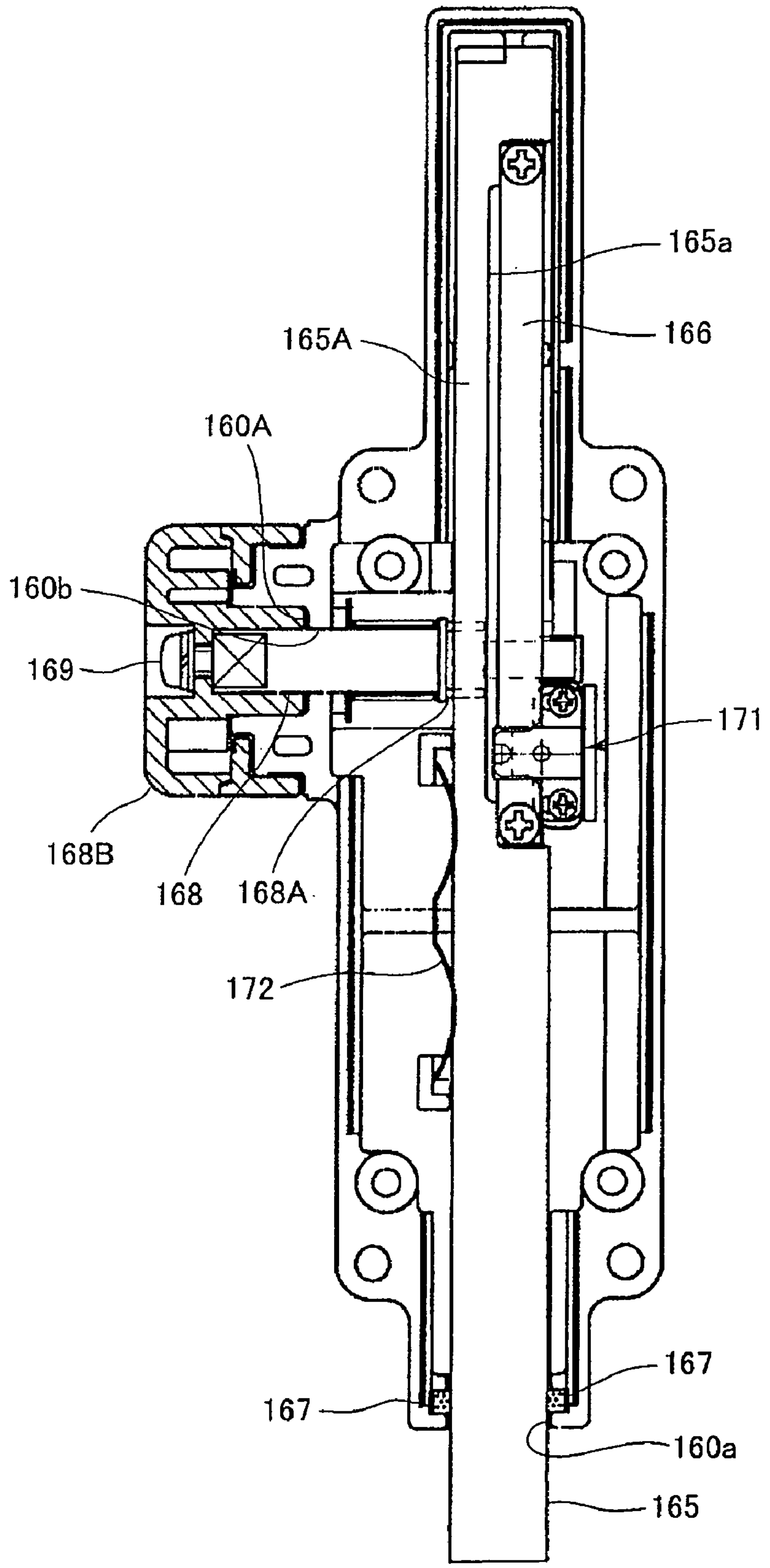
FIG. 11 is an exploded front view showing the digital display unit.

A part of the stopper pole 165 which lies in the housings 163 and 164 has a notch 165*a* as shown in FIG. 11. The notch 165*a* is so shaped that a part of the stopper pole 165 is narrower than the other parts thereof. To make a narrow part 165A, a part of the stopper pole. 165 which has the notch 165*a* is wrapped with the tape 166 having a plurality of parallel narrow slits 166*a* (see FIG. 15). As FIG. 11 shows, two ends of the tape 166 are fastened with screws to the stopper pole 165 which has the notch 165*a*. The tape 166 has 150 slits 166*a* per one inch in the longitudinal direction.

As FIG. 14 depicts, a rack 165B is provided on the back of that part of the narrow part 165A which is illustrated in FIG. 11. Housings 20 and 21 have a shaft-insertion through hole 160*b* that connects the interior and exterior of the housings 163 and 164.

As shown in FIG. 11, the shaft-insertion through hole 160*b* opens outward from the housings 163 and 164, extending in a direction perpendicular to the stopper pole 165. A shaft 168 is supported in the shaft-insertion through hole 160*b* and can rotate about an axis thereof and can move in the axial direction thereof. The shaft 168 has a pinion 168A at one end. The pinion 168A can mesh with the rack 165B provided on the stopper pole 165. The housings 163 and 164 have a stepped part 160A at the rim of the shaft-insertion through hole 160*b*, where the hole 160*b* opens to the exterior of the housings 163 and 164. A pin 168C, which will be described later, can engage with the stepped part 160A. Note that only a part of the rack 165B is shown in FIG. 14, for simplicity of explanation.

A knob 168B is mounted on the other end of the shaft 168. The knob 168B has a ring-shaped cross section taken along a plane that is perpendicular to the shaft 168. The knob 168B has a through hole at the center of the cross section. The through hole has a female thread that can mesh with a male screw 169 described later. The male screw 169 is inserted into one end of the through hole and penetrates the through hole. The head of the male screw 169 abuts on the knob 168B. The male screw 169 projecting from the other end of the through hole is set in mesh with the female thread (not shown) formed in the inner surface of a recess (not shown) that is made in the other end of the shaft. The knob 168B can therefore be rotated together with the shaft 168 and can move in the axial direction thereof. As FIG. 13 shows, the pin 168C shaped like a round pillar protrudes in the diametrical direction of the shaft 168.

Figure 12:
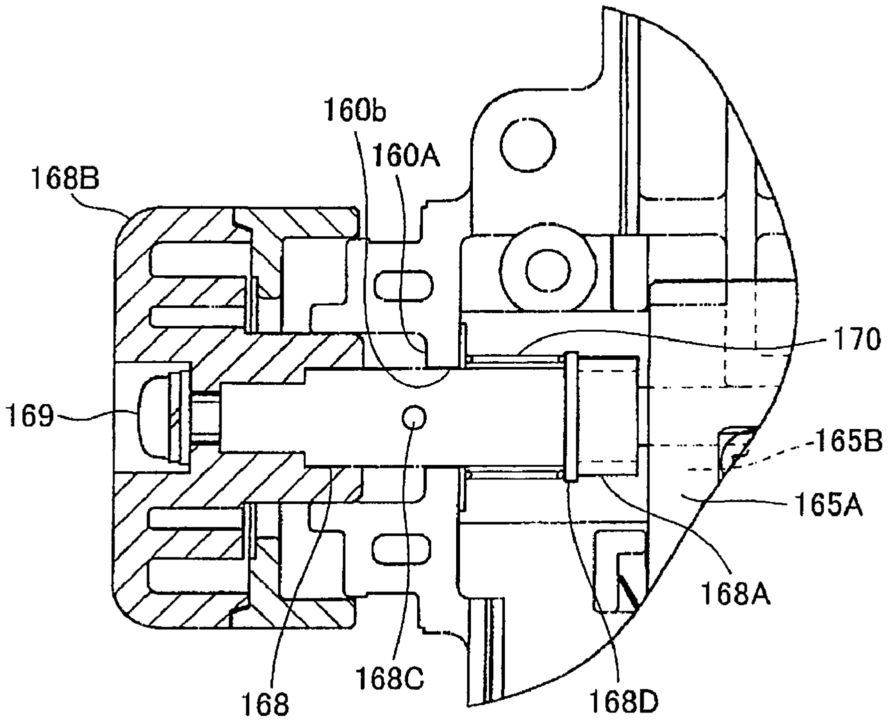
FIG. 12 is an exploded front view showing main parts of the digital display unit.
Figure 13:
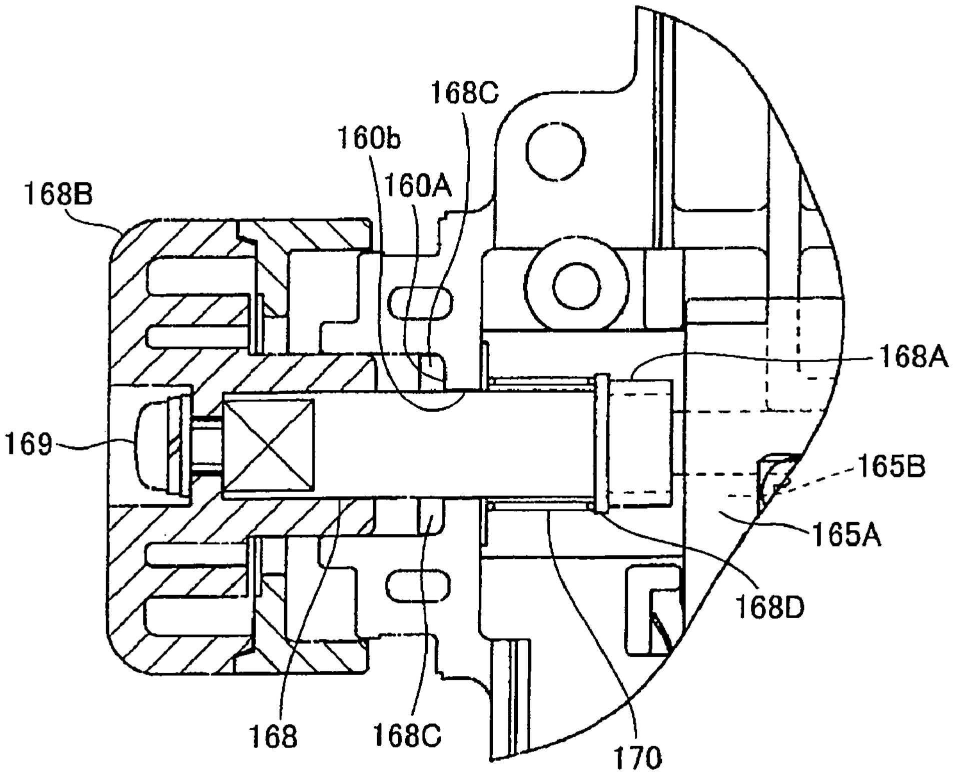
FIG. 13 is an exploded front view depicting main parts of the digital display unit.

As shown in FIGS. 12 and 13, the shaft. 168 has a stepped part 168D near the other end, where the pinion 168A is provided. A compression spring 170 is wound around the shaft 168 which is closer to the other end than the pinion 168A. One end of the compression spring 170 abuts on the stepped part 168D. The other end of the spring 170 abuts on parts of the housings 163 and 164 which define the shaft-insertion through hole 160*b*. The compression spring 170 always biases the shaft 168 to the right (in FIGS. 12 and 13), or toward the position where the pinion 168A can engage with the rack 165B as illustrated in FIGS. 12 and 13.

A part of the knob 168B, located at a position in the lengthwise direction of the shaft 168, abuts on parts of the housings 163 and 164 which define the shaft-insertion through hole 160*b* when no external force pulls the knob 168B outwards. At this time, the pinion 168A meshes with the rack 165B. Thus, the knob 168B may be turned, moving the stopper pole 165 in the lengthwise direction thereof. The position of the stopper pole can therefore be finely adjusted.

When an external force pulls the knob 168B outwards, the knob 168B is moved to the left as shown in FIG. 12. In this case, the part of the knob 168B located at a position in the lengthwise direction of the shaft 168 does not abut on the parts of the housings 163 and 164 which define the shaft-insertion through hole 160*b*. Hence, the pinion 168A is out of mesh with the rack 165B. The stopper pole 165 will not be moved even if the knob 168B is turned.

In this condition, the knob 168B may be turned, rotating the shaft 168 and thus setting the shaft 168 from the state of FIG. 12 to the state of FIG. 13. Then, the pin 168C engages with the stepped part 160A, preventing the shaft 168 and the knob 168B from moving to the right against the bias of the compression spring 170. As a result, the rack 165B and the pinion 168A remain disengaged from each other.

As FIG. 14 depicts, a photoelectric detection unit 171 is provided at the tape 166 extending over the notch 165*a* of the stopper pole 165 in the housings 163 and 164. The detection unit 171 detects the distance by which the tape 166 has moved together with the stopper pole 165 to determine the moving distance of the stopper pole 165. As shown in FIG. 14, the detection unit 171 is positioned, extending over the tape 166 in the thickness direction thereof. A light-emitting part 171A is arranged on one side of the tape 166, and a light-receiving part 171B is arranged on the other side of the tape 166. Two sets of the light-emitting part 171A and light-receiving part 171B are provided in order that they are arranged to be shifted by a ¼ cycle to each other. Hence, the detection unit 171 can detect the moving amount of the tape 166 as well as a moving direction of the tape 166, upwards or downwards, in FIG. 14.

As seen from FIG. 11, in the housings 163 and 164, a leaf spring 172 is provided, facing the stopper pole 165. The leaf spring 172 is bent in the form of an arc. When a middle point of the arc-shaped spring 172 is pushed in a radial direction of the arc, the leaf spring 172 is bent to have a shape in that two arc parts are connected. The leaf spring 172 is supported by the housings 163 and 164 with the substantially middle part and at both ends thereof. As the two arc parts abuts on the stopper pole 165, the leaf spring 172 pushes the stopper pole 165 in a direction almost perpendicular to the lengthwise direction of the stopper pole 165. The leaf spring 172 always pushes the stopper pole 165 to prevent the stopper pole 165 from making a play in the housings 163 and 164.

As FIG. 10 shows, a display unit 160B is provided on the front of the digital display unit 160. The display unit 160B has a liquid crystal display (LCD) 160C, a light ON/OFF switch 160D, a zero-setting switch 160E, and a changeover/TABLE switch 160F. The LCD 160C displays digital data representing the moving distance of the stopper pole 165. The switches 160D, 160E and 160F are arranged around the LCD 160C.

Figure 34:
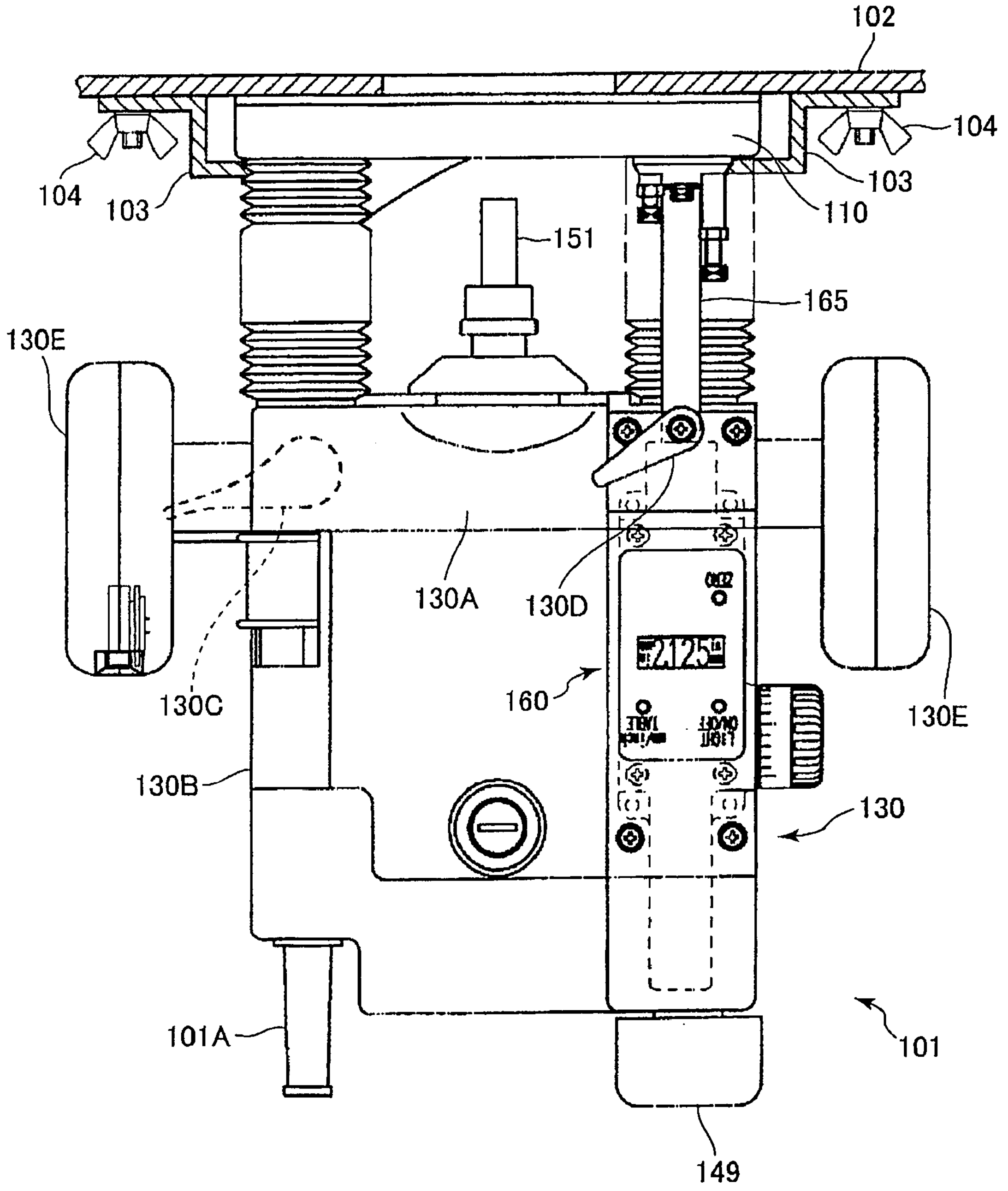
FIG. 34 is a front view of the router used together with a router table.
Figure 35:
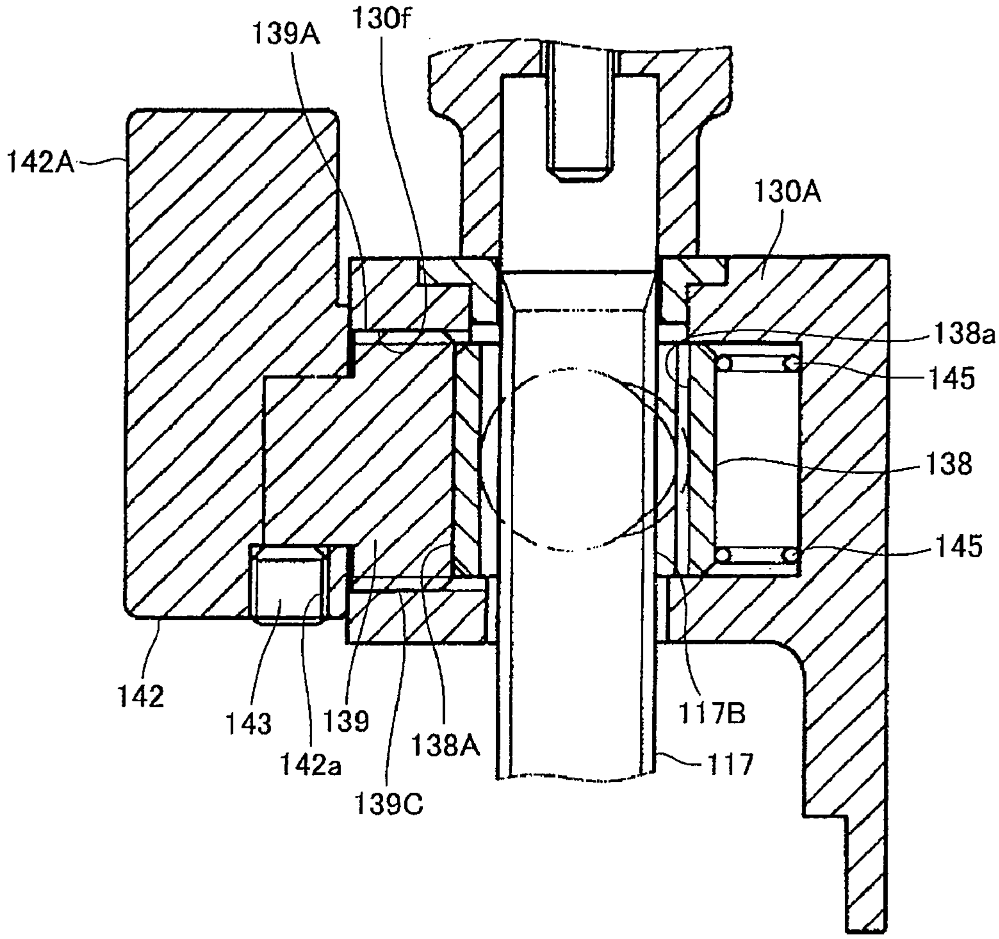
FIGS. 35 and 36 are sectional views of a part of the router, illustrating the engagement member in an disengaged position.
Figure 36:
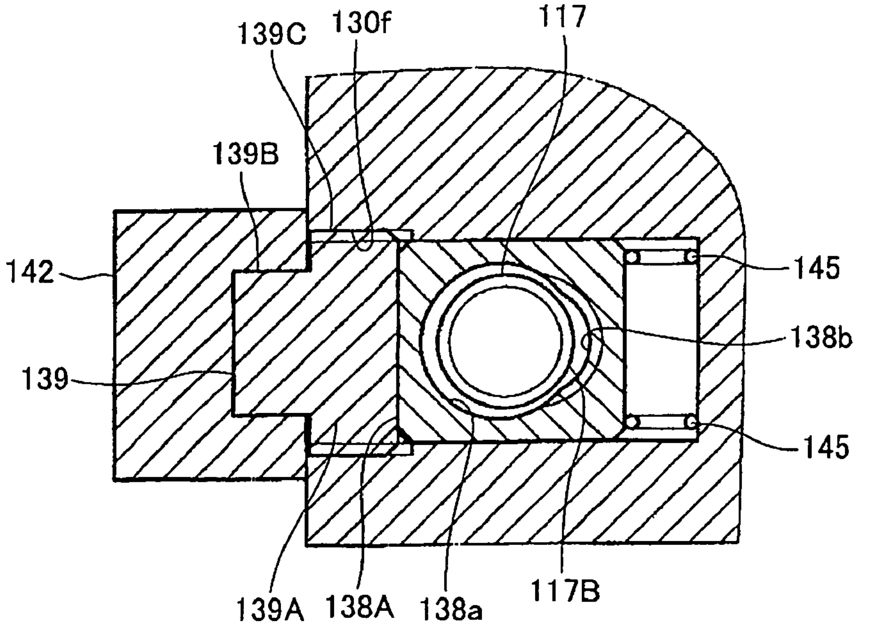
Figure 37:
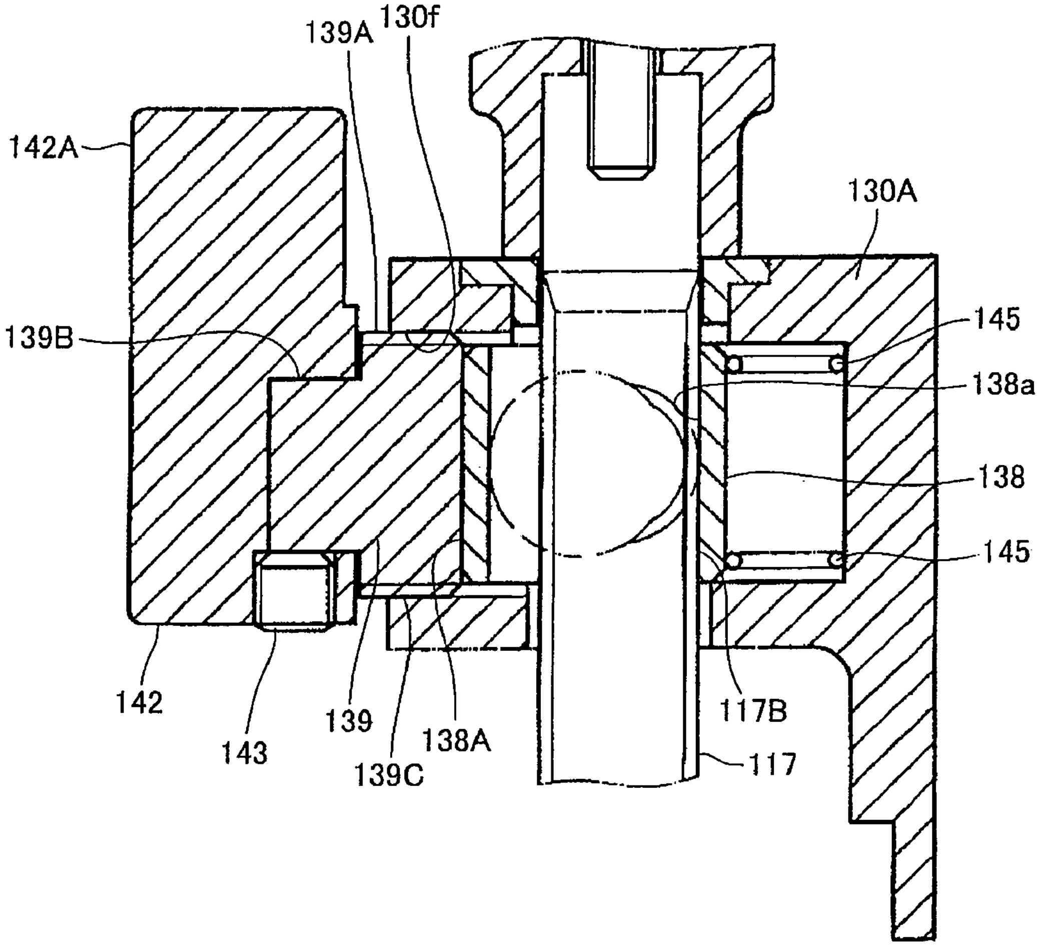
FIGS. 37 and 38 are sectional views of a part of the router, showing that the engagement member is at the engaged position.
Figure 38:
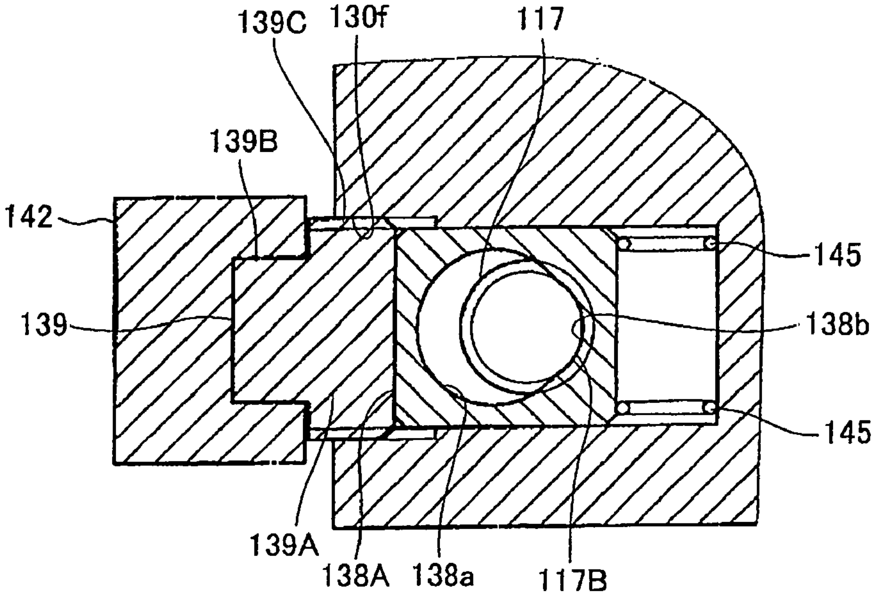

The light ON/OFF switch 160D is a switch that turns on the backlight of the display unit 160B, when the router 101 is attached to the router table 102 and the base 110 is located above the main unit 130 as illustrated in FIG. 34 and the display unit 160B is too dark to read the data. Every time the switch is depressed, the display mode of the display unit 160B changes from one to another. The display unit 160B operates in three display modes. In the first mode, no data such as numerical data is displayed at all. In the second mode, the backlight is OFF and numerical data is displayed.

In the third mode, the backlight is ON and numerical data is displayed. The zero-setting switch 160E resets the moving distance of the stopper pole 165, which the LCD 160C displays, to "0" that is the reference value.

Figure 16:
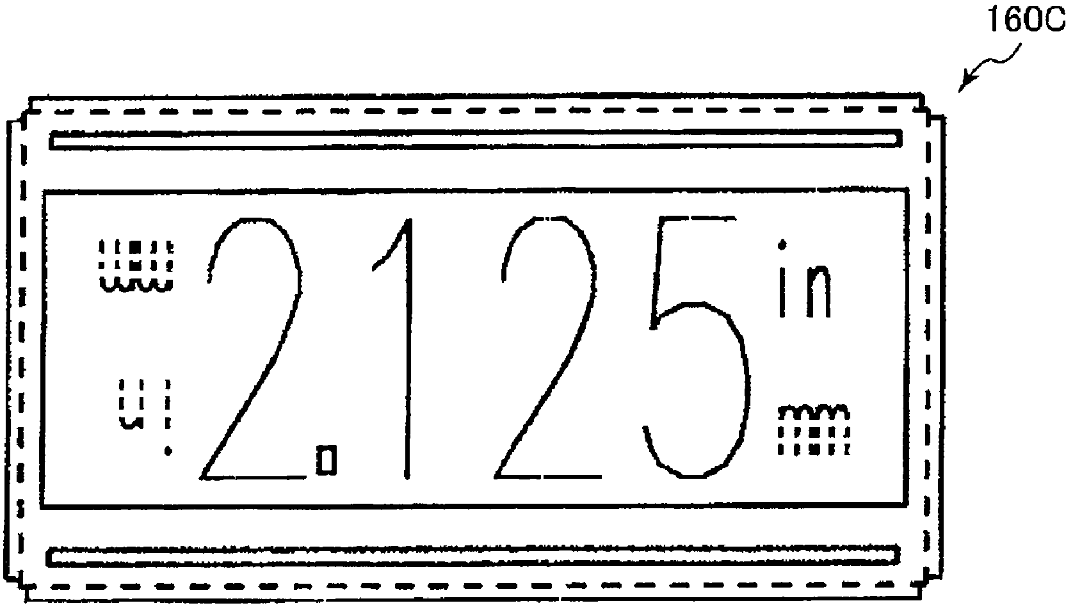
FIG. 16 is an enlarged view of the digital display unit, showing that a liquid crystal display (LCD) displays a value in inches.
Figure 17:
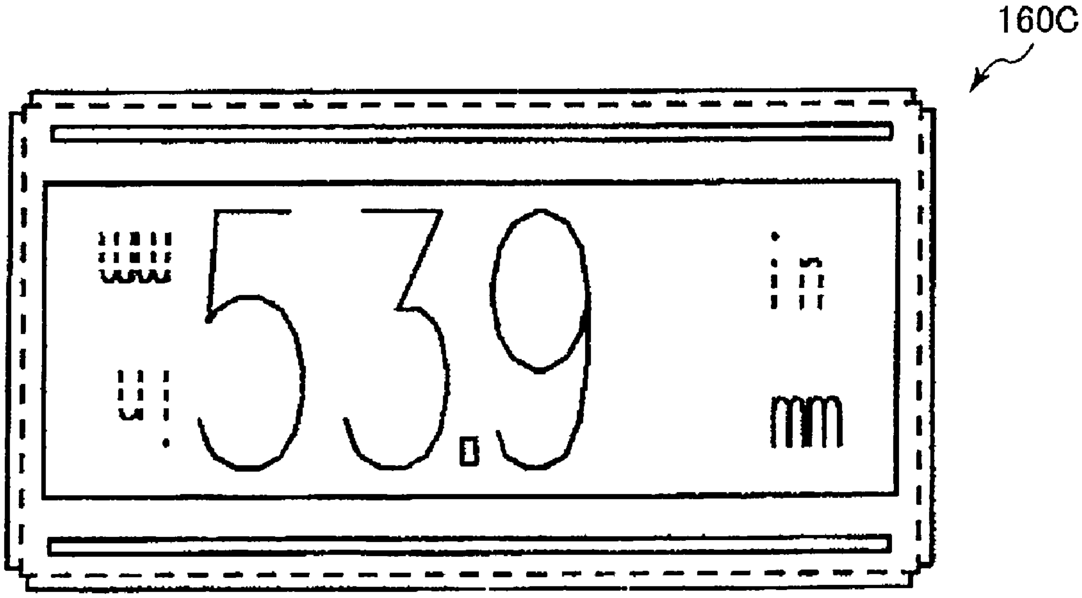
FIG. 17 is an enlarged view of the digital display unit, showing that the LCD displays a value in meters.

The changeover/TABLE switch 160F functions as two switches, i.e., a changeover switch and a TABLE switch. The two functions are switched from one to the other when the switch 160F is kept depressed longer than a predetermined time (3 seconds in this embodiment). When pushed while functioning as changeover switch, the switch 160F displays the unit of the distance, either "inch" as shown in FIG. 16 or "mm" as shown in FIG. 17. When pushed while functioning as TABLE switch, the switch 160F causes the LCD 160C to reversely display the distance as is illustrated in FIG. 34.

Figure 18:
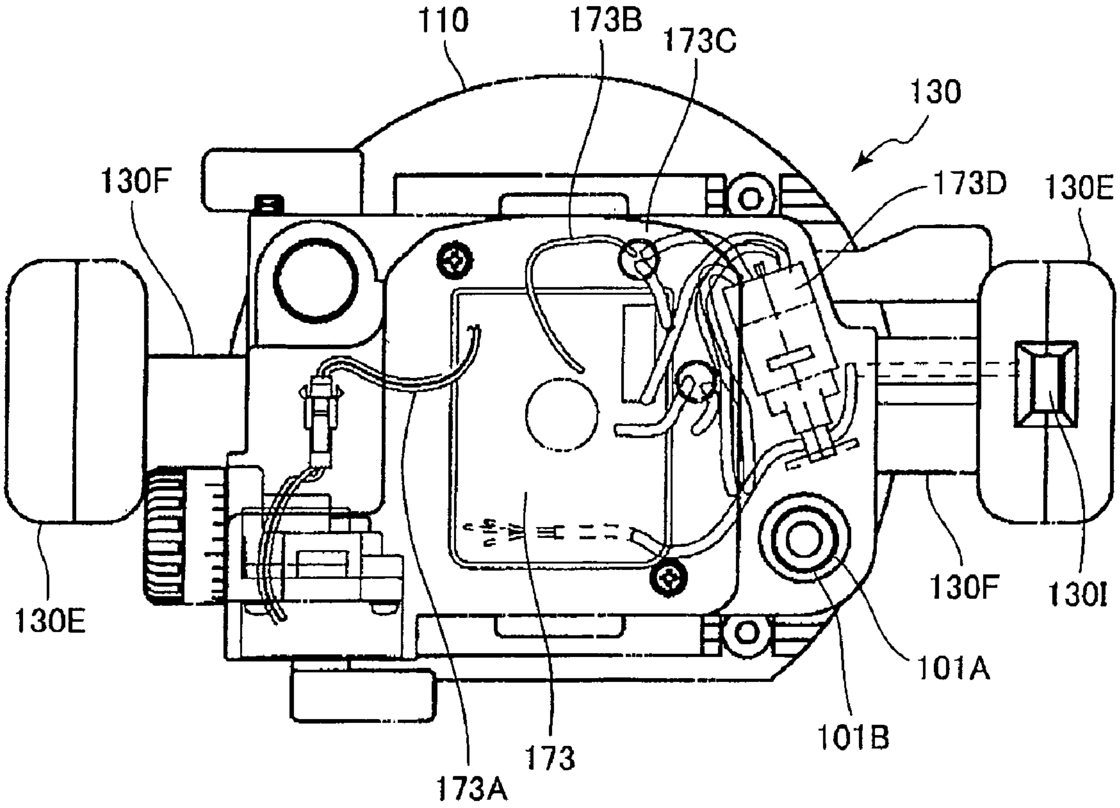
FIG. 18 is a bottom view illustrating a power-supply circuit provided in the router.

A power-supply circuit 173 (FIG. 18), provided to supply power to the electric motor 131, is used to power to the digital display unit 160. A power-supply cable 101A for receiving power from an external source has one end 101B connected to the top of the main unit 130 shown in FIG. 1. As shown in FIG. 18, the power-supply circuit 173 is provided in the main unit 130 and arranged near a position where the end 101B of the cable 101A is connected to the main unit 130. Since the power-supply circuit 173 is connected at this position, the power supplied through the power-supply cable 101A is prevented from containing noise in the main unit 130 before the power is supplied to the power-supply circuit 173.

A cord 173A extends from the power-supply circuit 173 to the digital display unit 160. The power supplied through the cord 173A is converted to a voltage of a specific value, which is applied to the digital display unit 160. A cord 173B is connected by a connector 173C to the electric motor 131. The power supplied through the cord 173B is converted to a voltage of a specific voltage, which is applied to the electric motor 131. An ON/OFF switch 173D is provided on the middle part of the cord 173B for supplying power to the electric motor 131. When the switch 173D is turned on, the electric motor 131 is driven. When the switch 173D is turned off, the electric motor 131 is stopped. As shown in FIG. 1, a knob 130D is provided on a part of the electrically conductive casing 130A which faces the stopper pole 165. This knob 130D may temporarily disable the stopper pole 165 from moving with respect to the main unit 130.

Two handles 130E are provided on the left and right ends of the main unit 130 shown in FIG. 1. More specifically, on the left and right ends (FIG. 1) of the electrically conductive casing 130A, two main-unit projections 130F are provided, and the handles 130E are rotatably mounted on the distal ends of the main-unit projections 130F, respectively. The handles 130E are hollow rectangular solids, each having an intra-handle space 130G. They have a rectangular cross section taken along a plane perpendicular to the direction in which the main-unit projections 130E extend. Of the two corners of the cross section, one corner is rounded at the end of the cross section, as illustrated in FIGS. 24 and 25.

Figure 24:
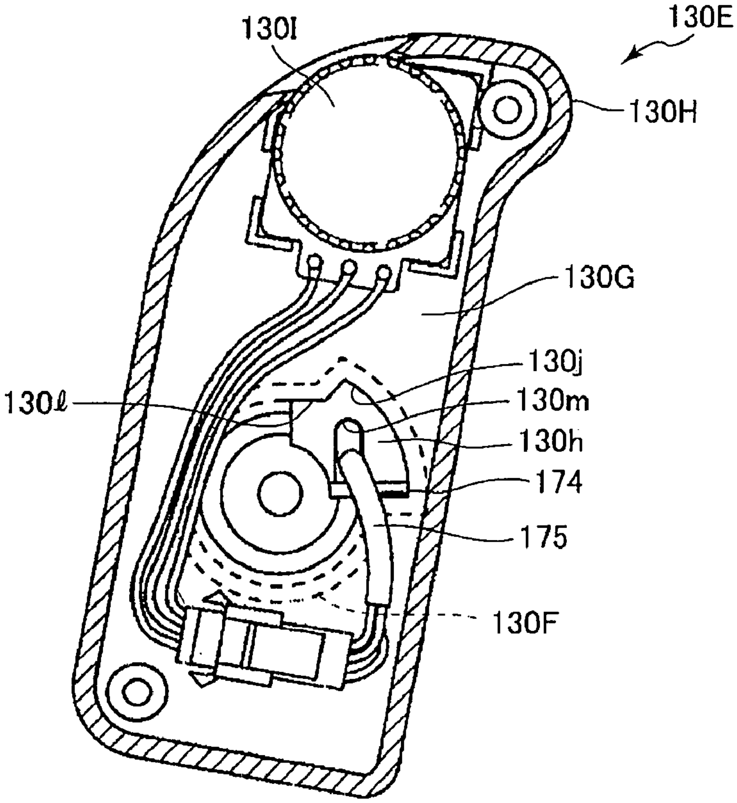
FIG. 24 is a sectional side view showing a handle of the router.
Figure 25:
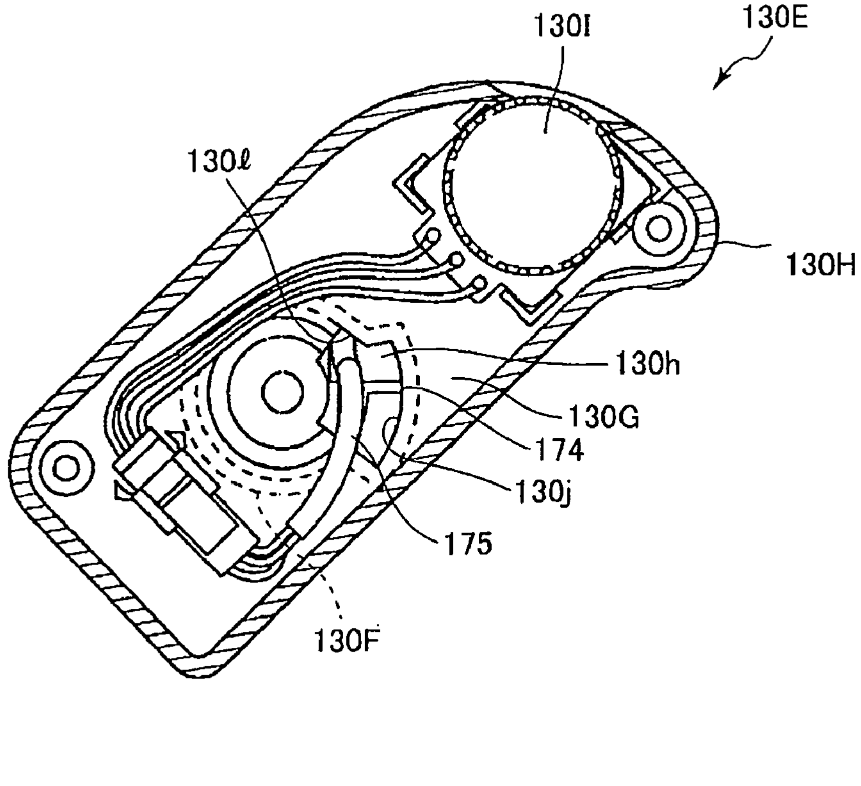
FIG. 25 is a sectional side view showing the handle pivoted with respect to the main unit.
Figure 29:
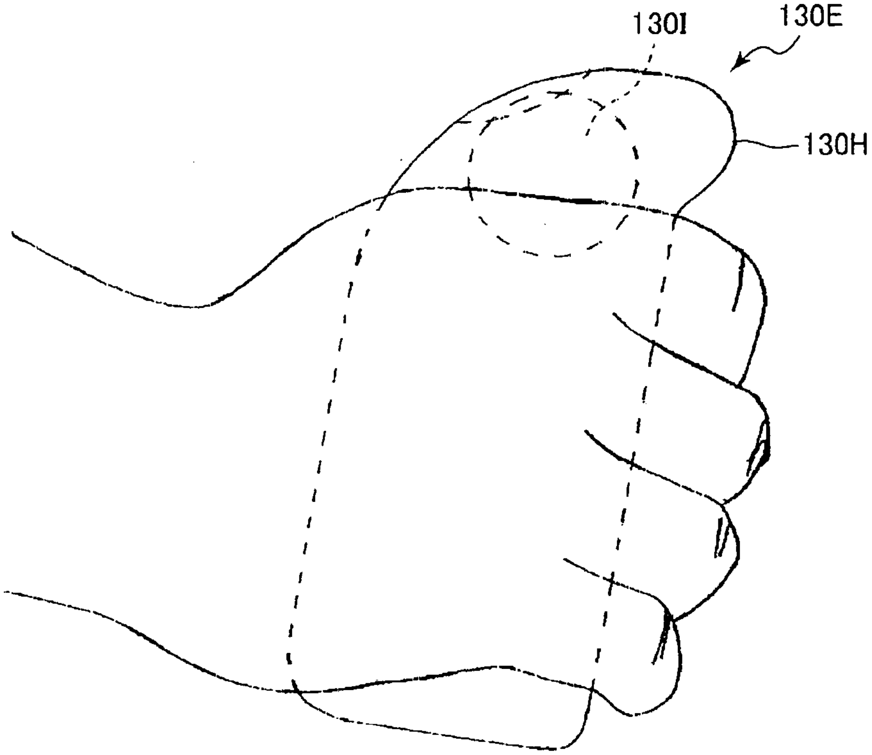
FIG. 29 is a diagram showing a way for a user to hold the handle.
Figure 30:
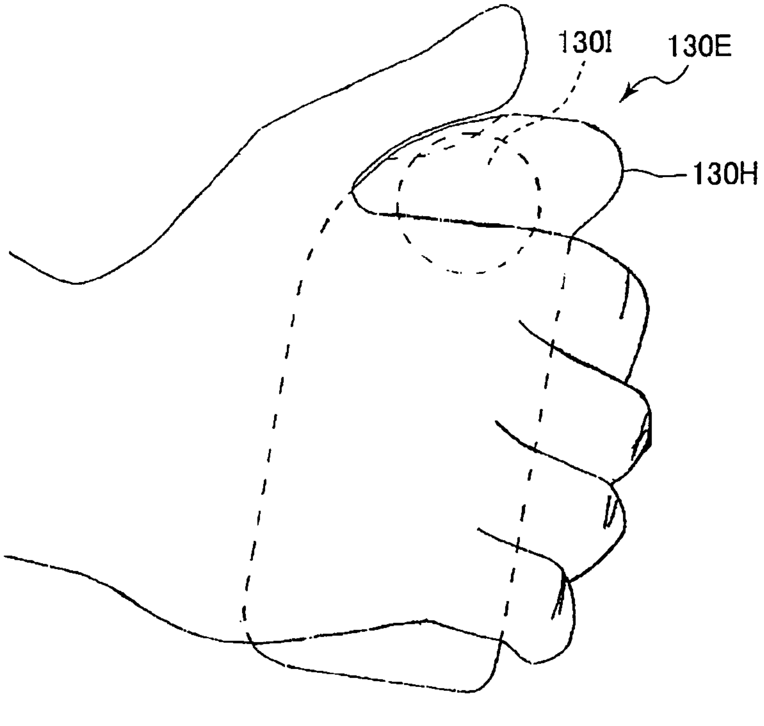
FIG. 30 is a diagram showing a way for the user to operate a speed-changing dial, holding the handle.

As shown in FIGS. 24 and 25, a projection 130H protrudes outward from the other of the two corners of each handle 130E, which is not rounded, in a direction almost perpendicular to the long sides of the rectangle. The user may hold each handle 130E with hand as is illustrated in FIGS. 29 and 30. If the user holds each handle 130E, with the cushion of the forefinger placed on the projection 130H, the handle 130E is prevented from moving in the lengthwise direction thereof.

A speed-changing dial 130I is provided in one of the handles 130E and located near the projection 130H so that the dial may be rotated by the user with the thumb. That is, as shown in FIGS. 24 and 25, the dial 130I is positioned in the rounded corner of the handle 130E, as viewed in the cross section taken along the plane perpendicular to the direction in which the main-unit projections 130F extends. When the user rotates the dial 130I, the rotation speed of the electric motor 131 can be adjusted. As FIGS. 24 and 25 show, the speed-changing dial 130I is constituted by an adjustable resistor, and shaped like a disc. The speed-changing dial 130I is supported to the handle 130E to rotate about the axis. The axis of rotation is parallel to the direction in which the main-unit projection 130F protrudes.

As FIGS. 24 and 25 show, most parts of the speed-changing dial 130I are provided in the handle 130E. Only a part of the circumferential surface is exposed outside the handle 130E. The exposed part of the speed-changing dial 130I lies inside the contour of the handle 130E, not projecting from the contour of the handle 130E. This prevents the user from rotating the speed-changing dial 130I by mistake.

Figure 26:
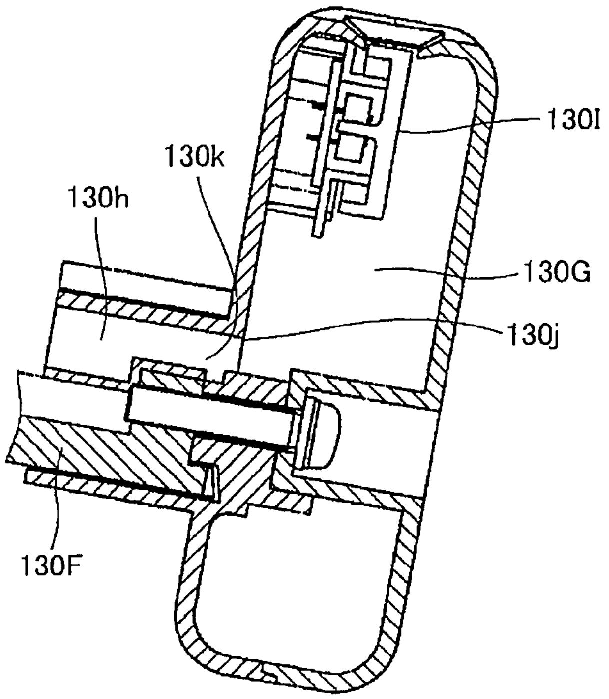
FIG. 26 is a sectional view of the handle, as viewed from a front of the router.
Figure 27:
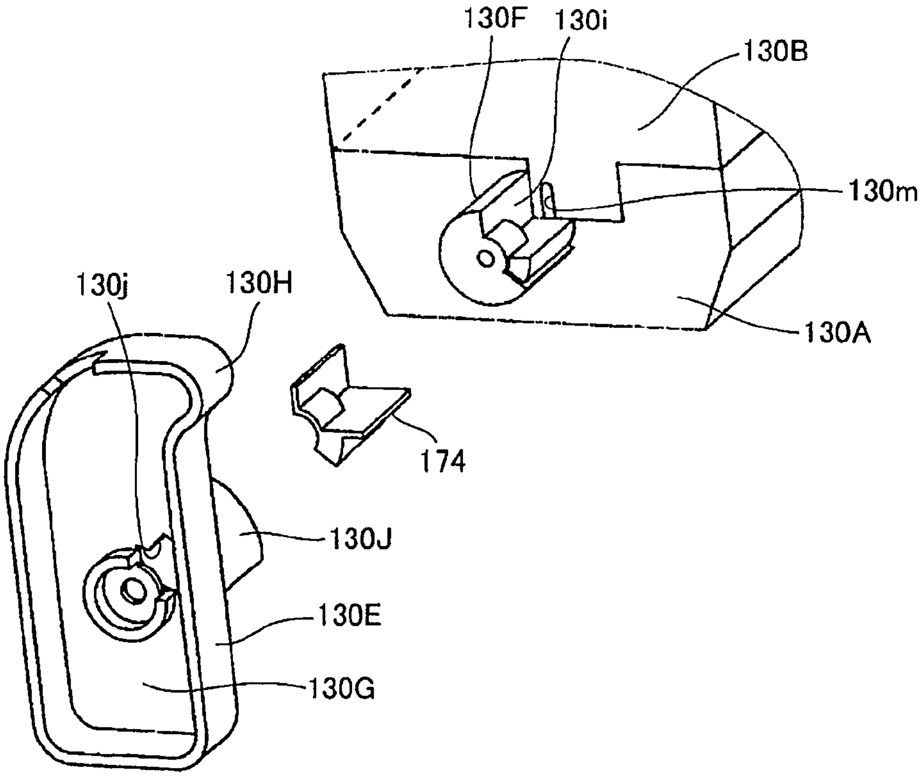
FIG. 27 is an exploded view showing the handle and a projection provided on the main unit.
Figure 28:
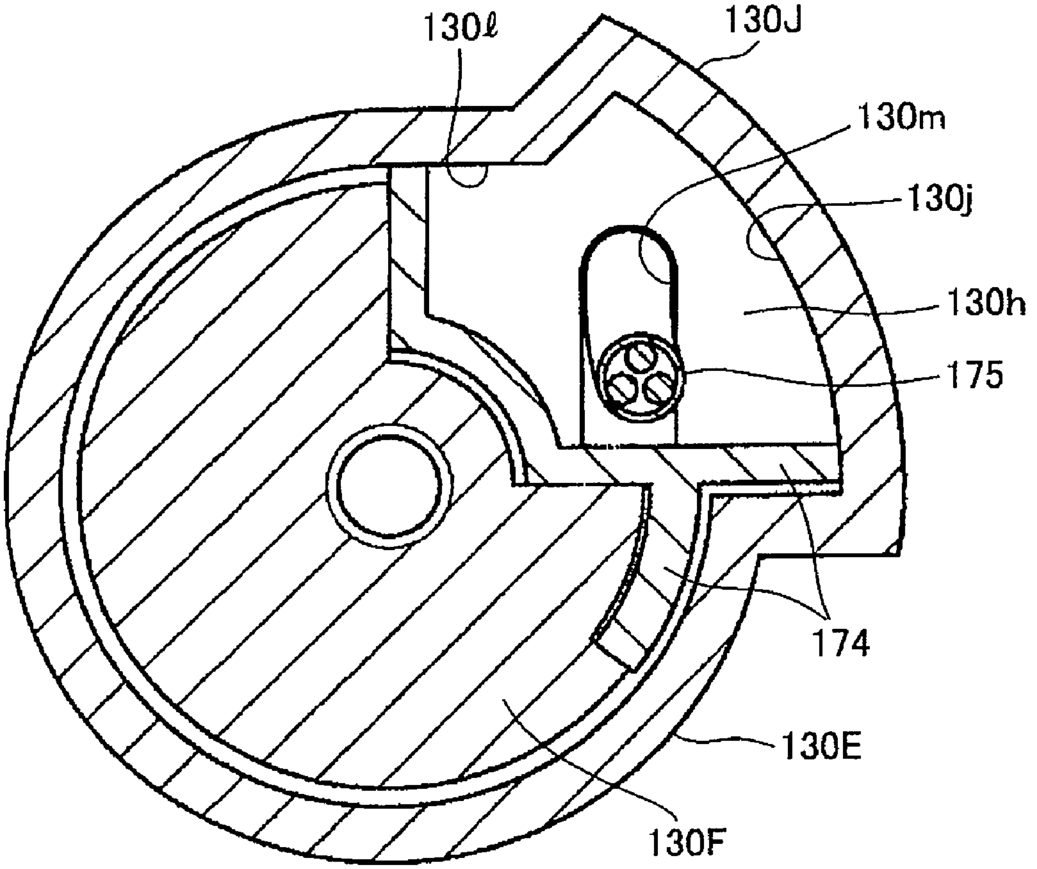
FIG. 28 is a sectional view of the router, illustrating a position at which the handle and the projection are connected to each other.

As shown in FIG. 27, the main-unit projection 130F, which is a round pillar, has a notch 130*i* that has a cross section shaped like a sector having an angle of 90° around the axis of the round pillar. The notch 130*i* extends in the axial direction of the main-unit projection 130F. On the other hand, the handle 130E has an arcuate part 130J having a shape complementary to the notch 130*i* formed in the round pillar. The arcuate part 130J projects from the handle 130E and is arranged coaxially with the main-unit projection 130F. An intra-main-unit projection space 130*h* is provided between the main-unit projection 130F and the arcuate part 130J as shown in FIGS. 24 to 26.

An insulating member 174 made of electrically insulating material is provided in the notch 130*i* formed in the main-unit projection 130F. As FIG. 27 depicts, the insulating member 174 complies in shape to the notch 130*i* formed in the round pillar. The insulating member 174 covers the notch 130*i*. The resin casing 130B of the main unit 130, which faces the notch 130*i*, has a cord-insertion hole 130*m*, though which a cord 175 extends.

The handle 130E has an handle-communication hole 130*j* that opposes the main-unit projection 130F. Through the hole 130*j*, the intra-handle space 130G communicates with the exterior of the handle 130E. A part of the insulating member 174 projects into the handle-communication hole 130*j*. The insulating member 174 can therefore abut on the handle 130E which define the ends in which the handle 130E can be rotated. When the insulating member 174 abuts on the handle 130E, the rotation of the handle 130E is restricted.

The intra-handle space 130G and the intra-main-unit projection space 130*h* are connected by the handle-communication hole 130*j* and the main-unit-projection communication hole 130*k*. The spaces 130G and 130*h* remain connected, no matter which position the handle has been rotated to. As indicated above, the handle 130E can be rotated about the main-unit projection 130F. Nonetheless, the intra-handle space 130G and the intra-main-unit projection space 130*h* are required not to be disconnected from each other when the handle 130E is rotated. This is because the cord 175 (see FIG. 24, etc.) is arranged in the intra-handle space 130G and intra-main-unit projection space 130*h*, as will be described later.

Accordingly, as shown in FIGS. 24 and 25, a recess 1301 is made at one end of the handle-communication hole 130*j*, as viewed from the direction in which the handle 130E is rotated. The recess 130*l* extends from the end of the hole 130*j* in the direction in which the handle 130E is rotated. Through the recess 130*l*, the intra-handle space 130G and intra-main-unit projection space 130*h* communicate with each other at all times. When the handle 130E is rotated, causing the insulating member 174 to abut on one end of the handle-communication hole 130*j*, the cord 175 temporarily recedes into the recess 130*l*.

The cord 175 is connected at one end to the electric motor 131 (FIG. 1). The cord 175 extends through the cord-insertion hole 130*m*, straddles the insulating member 174, further extends through the intra-main-unit projection space 130*h*, the main-unit-projection communication hole 130*k* and the handle-communication hole 130*j*, and enters the intra-handle space 130G. The cord 175 is connected at the other end to the speed-changing dial 130I.

Since the handles 130E can be rotated, the user can use the router 101 with the handles 130E set at a desired angle. When the handles 130E are rotated, the intra-handle space 130G always communicates with the intra-main-unit projection space 130*h* because of the recess 130*l* made in the handle-communication hole 130*j*. Hence, the cord 175 can pass through the intra-handle space 130G and intra-main-unit projection space 130*h*.

As described above, the speed-changing dial 130I designed to adjust the rotation speed of the electric motor 131 is provided in one handle 130E and located near the projection 130H so that the user who holds this handle 130E may rotate the dial with the thumb. Therefore, the user can rotate the dial 130I to set the rotation speed of the electric motor 131 to an optimal speed, while observing the depth of the groove that the cutter 151 is forming in the workpiece.

Figure 20:
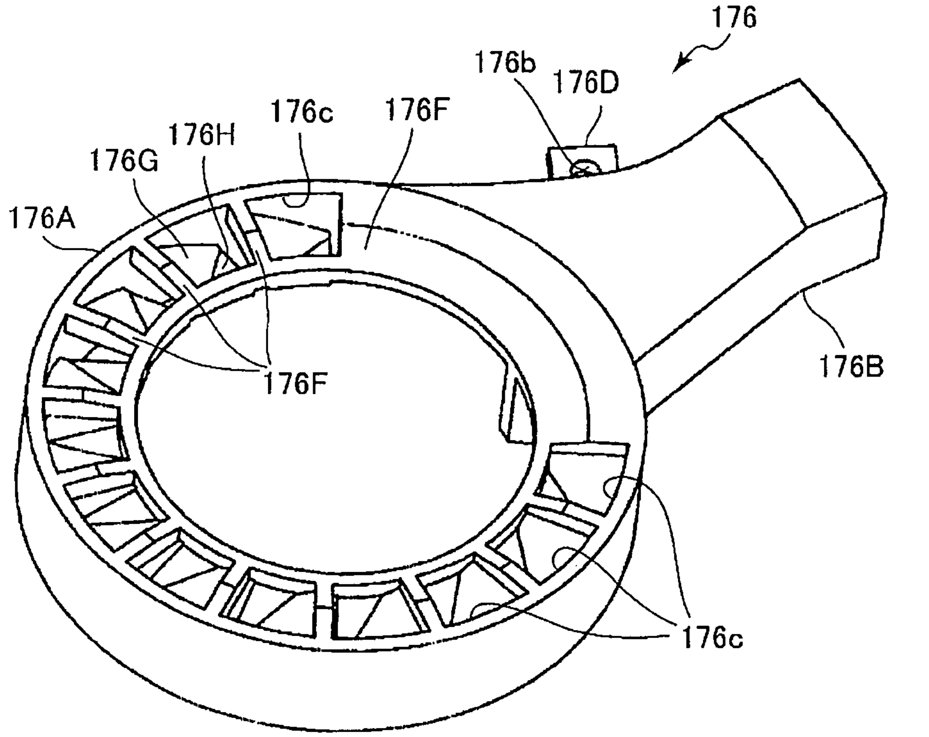
FIG. 20 is a perspective view of a dust guide provided in the router.

Referring to FIG. 1, the dust guide 176 is secured to the base 110, held in the dust-guide receptacle and opposing the annular through hole 130*d* made in the electrically conductive casing 130A. The dust guide 176 has a hollow cylindrical part 176A and an outlet port 176B as illustrated in FIG. 20. The hollow cylindrical part 176A is short in its axial direction. When the cutter 151 bites deep into the workpiece as will be described later, the inner circumferential surface 176C of the hollow cylindrical part 176A surrounds the cutter 151, being spaced from the cutter 151 in the radial direction thereof.

As FIG. 19 depicts, two recesses 176*a* are made in the outer circumferential surface of the hollow cylindrical part 176A. As shown in FIG. 19, the recesses 176*a* are spaced from the outlet port 176B by 120° and 240°, respectively, on the assumption that the outlet port 176B is located at the position of +45° in the clockwise direction as viewed from the main unit 130 toward the base 110. Two claws 110E are provided in the dust-guide receptacle, and lie in these recesses 176*a*, respectively. The hollow cylindrical part 176A contacts almost all inner circumferential surface of the recess 110*a* made in the dust-guide receptacle. The hollow cylindrical part 176A therefore positions the dust guide 176 in the dust-guide receptacle in the radial direction thereof. The rotation of the dust guide 176 is restricted, because the dust-guide fastening screw 176E fastens the dust guide 176 to the base 110.

As illustrated in FIG. 19, the projection 176D is provided on the dust guide 176, in the vicinity of the outlet port 176B. The projection 176D has a through hole 176*b* (see FIG. 20). When the dust guide 176 lies in the dust receptacle, the two claws 110E are set in the two recesses 176*a*, respectively. At the same time, the dust-guide fastening screw 176E passes through the through hole 176*b* and is set in screw engagement with a hole (not shown) made in the base 110. The dust guide 176 is thereby fixed to the base 110.

An upper wall 176F is provided on the upper end of the hollow cylindrical part 176A that opposes the main unit 130. The upper wall 176F extends from the outer circumferential surface of the hollow cylindrical part 176A in the radial direction thereof. As FIG. 19 shows, the upper wall 176F has 12 trapezoidal through holes 176*c* arranged at regular intervals in the circumferential direction of the hollow cylindrical part 176A, over an angular distance of about 270°. Thus, fan air can flow from the upper end of the hollow cylindrical part 176A to the lower end thereof, via these through holes 176*c*.

Due to the upper wall 176F, the hollow cylindrical part 176A has a small opening area The upper wall 176F can therefore prevent chips of the workpiece generated by the operating cutter 161 from scattering outside from the space defined by the inner circumferential surface 176C of the hollow cylindrical part 176A. A hose (not shown) may be used to connect the dust guide 176 to a dust collector (not shown). Then, dust can be collected at high efficiency.

A first wall 176G and a second wall 176H are provided on the inner circumferential surface 176C. The first and second walls 176G and 176H have been made by bending a corner of a plate having the same shape as the trapezoidal through holes, thus forming a straight ridge connecting two sides defining the corner. The first wall 176G is one part of the plate bent in the above manner, and the second wall 176H is the other part thereof. The first and second walls 176G and 176H, which are connected at the straight edge, define an obtuse angle.

The first wall 176G inclines clockwise (FIG. 19) to the inner circumferential surface 176C, or in the direction in which the cutter 151 is rotated. That is, the first wall 176G inclines from the upper end of the inner circumferential surface 176C toward the lower end thereof, namely from the obverse side to the reverse side of the drawing sheet (FIG. 19). The second wall 176H inclines clockwise in FIG. 19 to the inner circumferential surface 176C of the dust guide 176. That is, the second wall 176H inclines in the rotating direction of the cutter 151, and outward in the radial direction of the inner circumferential surface 176C. The second wall 176H inclines from the upper edge to the lower edge of the inner circumferential surface 176C, namely from the obverse side to the reverse side of the drawing sheet (FIG. 19).

Figure 21:
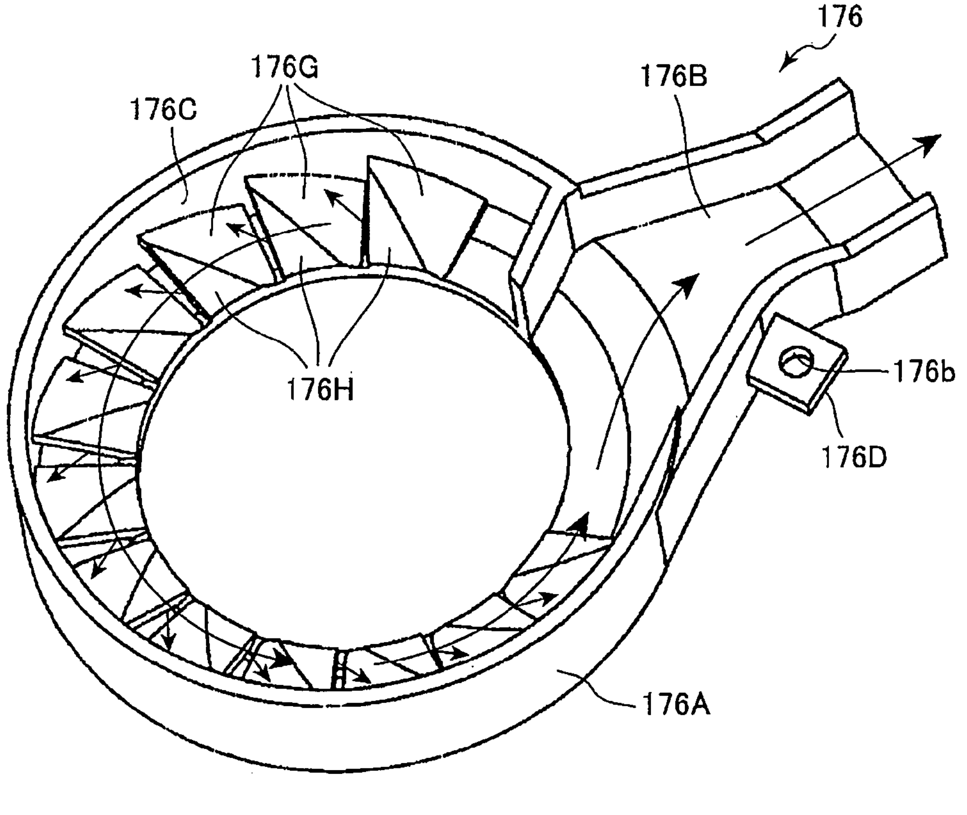
FIG. 21 is a perspective view of the dust guide of FIG. 20.
Figure 22:
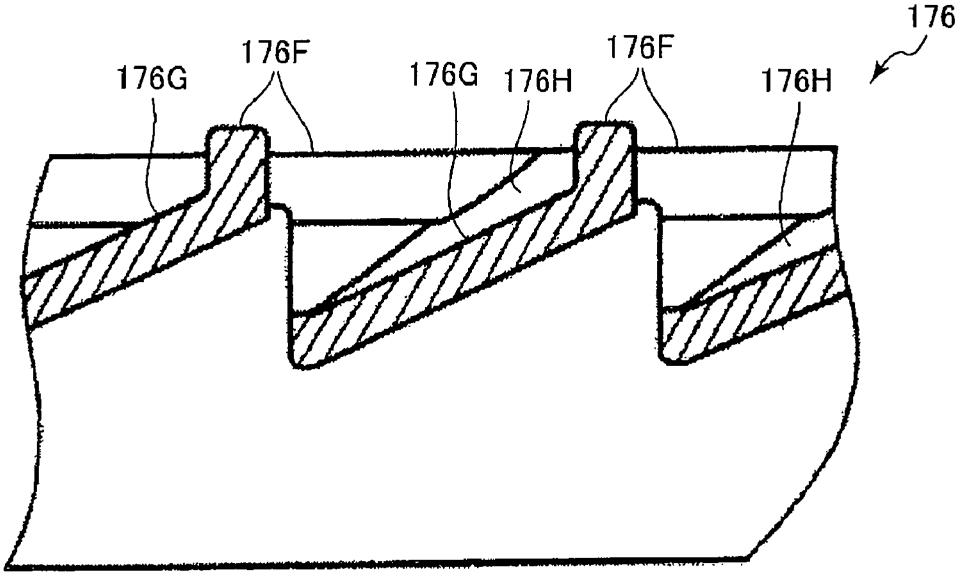
FIG. 22 is a partial sectional view of the dust guide shown in FIG. 20, illustrating first walls and second walls.

Since the first and second walls 176G and 176H are arranged in the above manner, the fan air can flow over the inner circumferential surface 176C, inwardly in the radial direction of the hollow cylindrical part 176A as indicated by arrow in FIG. 21. Namely, the fan air flows in the rotating direction of the cutter 151, or in the same direction as the chips scatter. The chips can therefore be guided to the outlet port 176B at high efficiency.

As illustrated in FIGS. 20 and 21, the outlet port 176B protrudes from the circumferential surface of the hollow cylindrical part 176A. The outlet port 176B is a hollow that defines a fan-air passage. As FIG. 21 depicts, the outlet port 176B connected to the hollow cylindrical part 176A opens to the space defined by the inner circumferential surface 176C and extending along the surface 176C. The fan-air passage therefore extends in a direction tangential to the hollow cylindrical part 176A. The outlet port 176B slightly bends at a predetermined distance from the hollow cylindrical part 176A, and the passage extends outwards in the radial direction of the hollow cylindrical part 176A.

The outlet port 176G, which communicates with the hollow cylindrical part 176A, can be connected to one end of the hose of the dust collector (not shown). Chips of the workpiece can therefore be drawn from the hollow cylindrical part 176A into the dust collector through the outlet port 176B of the dust guide 176 when the dust collector (not shown) is driven.

Even if the hose of the dust collector is not connected, the fan air can flow via the through hole of the upper wall 176F into the space defined by the inner circumferential surface 176C and then can flow along the inner circumferential surface 176C in the direction of the arrow shown in FIGS. 21 and 23. The chips, which would otherwise accumulate at a position near the inner circumferential surface 176C, can be efficiently moved in the circumferential direction and finally taken out through the outlet port 176B.

Figure 31:
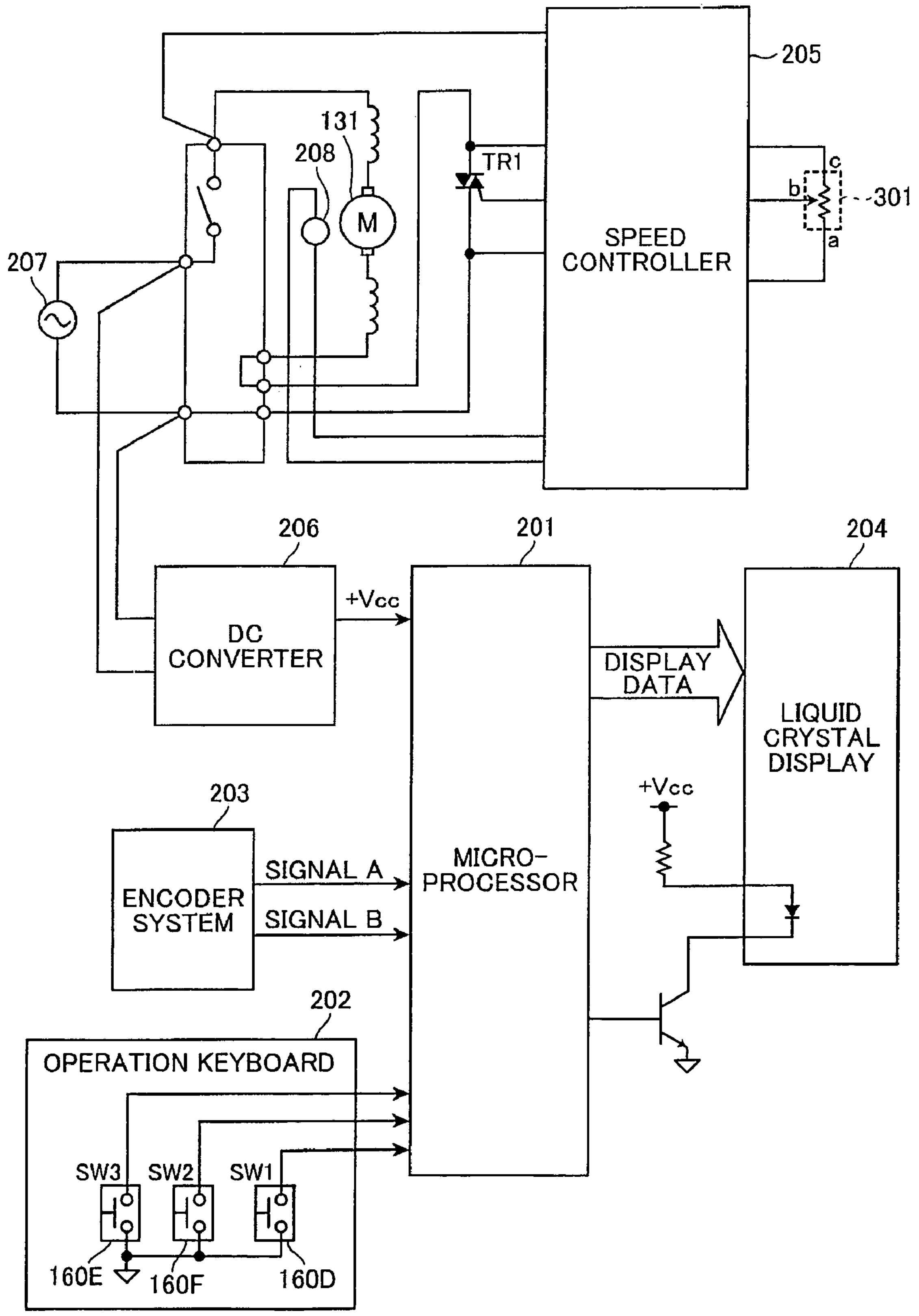
FIG. 31 is a block diagram showing a circuit configuration of the router.

The router 101 incorporates a circuit board, which will be described with reference to the block diagram of FIG. 31. As FIG. 31 shows, the circuit board has a microprocessor 201, an operation keypad 202, an encoder system 203, a liquid crystal display 204, a speed controller 205, and a DC converter 206. The hardware and software of the microprocessor 201 implement an up-down counter, an up-down clock, an arithmetic operation unit and an interface controller unit, which will be described later.

The DC converter 206 is the power-supply circuit 173 that has been described above. The microprocessor 201 is connected through the DC converter 206 to an AC power supply to which the electric motor 131 and the speed controller 205 for controlling the motor 131 at constant speed are connected. The speed-changing dial 130I and a rotation-speed detector 208 are connected to the speed controller 205. The rotation-speed detector 208 is configured to detect the revolutions per unit time of the electric motor 131. The DC converter 206 converts an alternating current to direct current supplied to the microprocessor 201. The microprocessor 201 is connected to the operation keypad 202 and the encoder system 203. The microprocessor 201 outputs display data to the liquid crystal display 204 so that the display 204 displays the data such as the depth of a groove to be cut in the workpiece.

The liquid crystal display 204 corresponds to the LCD 160C of the display unit 160B. The encoder system 203 corresponds to the above-mentioned detection unit 171. As described above, the unit 171 includes two sets of components, each consisting of a light-emitting part 171A and a light-receiving part 171B. The unit 171 is configured to detect the depth of the groove as well as the cutting direction of the groove. The encoder system 203 can output two signals A and B to the microprocessor 201, as shown in FIG. 32.

Figure 32:
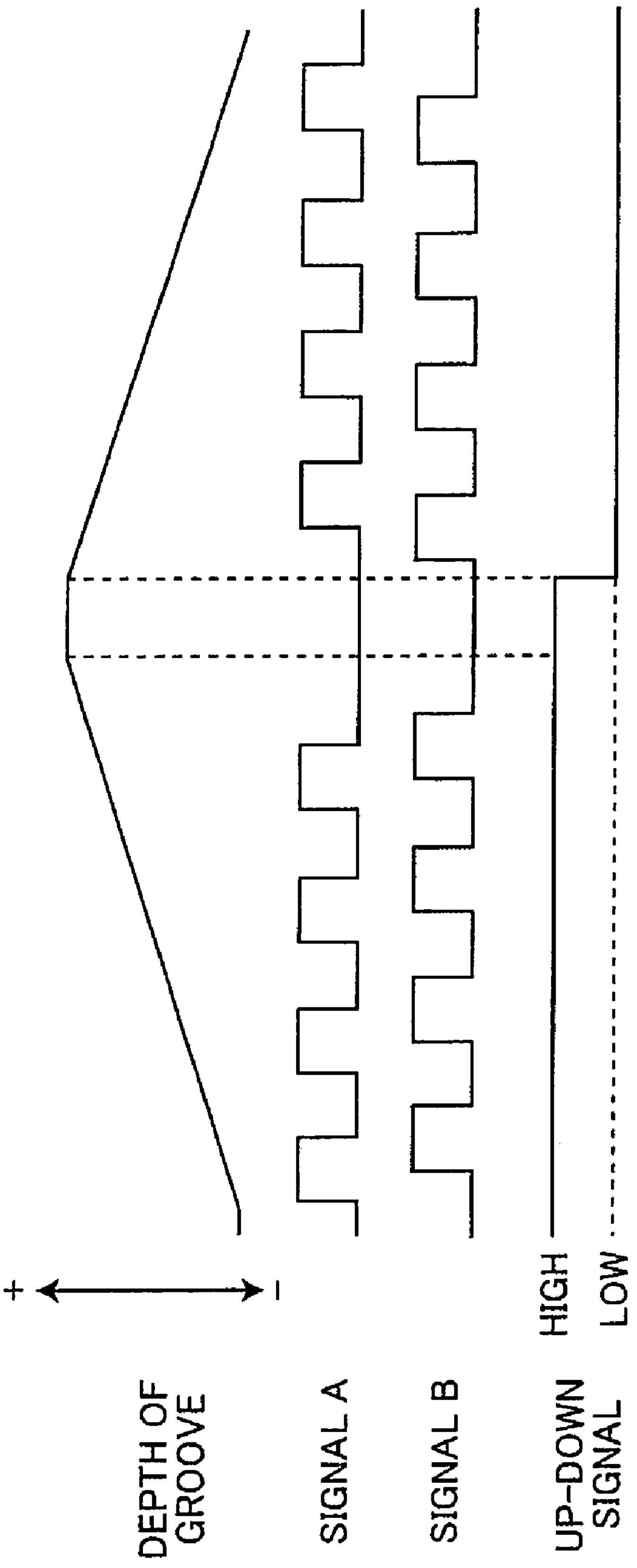
FIG. 32 is a graph representing a relationship between signals A and B, a depth of a groove to be cut, and an up-down signal.

As seen from FIG. 32, the signal A advances in phase by 90° with respect to the signal B while the stopper pole 165 (FIGS. 4 and 5) is moving relative to the main unit 130 to increase the depth of the groove, and delays in by 90° with respect to the signal B while the stopper pole 165 is moving relative to the main unit 130 to decrease the depth of the groove.

A narrow-width pulse is generated at the leading or trailing edge of signal A or B. This pulse, which is called four-segment pulse, is used as up-down clock signal for the up-down counter provided in the microprocessor 201 that receives the signal A or B.

The up-down signal is generated depending on whether the signal A advances or delays in phase with respect to the signal B. As the depth of the groove increases, the up-down signal maintains a high level when the signal A advances in phase by 90° with respect to the signal B, and the up-down counter increments every time the counter receives a up-down clock pulse. On the other hand, as the depth of the groove decreases, the up-down signal falls to and maintains at a low level when the signal A delays in phase by 90° with respect to the signal B, and the up-down counter decrements every time the counter receives a up-down clock pulse.

The operation keypad 202 has switches SW1, SW2 and SW3. The switches SW1, SW2 and SW3 correspond to the light ON/OFF switch 160D, the changeover/TABLE switch 160F, and the zero-setting switch 160E, respectively. As specified above, the switches 160D, 160E and 160F are arranged around the display unit 160B, i.e., the liquid crystal display 204 of the digital display unit 160. The unit in which the value is displayed on the display unit 160B is switched between the inch and the millimeter when the changeover/TABLE switch 160F, or SW2 is operated. If inch is selected as a unit of length, the count of the up-down counter is converted to the length in inches. If millimeter is selected as a unit of length, the count of the up-down counter is converted to the length in millimeters.

The data representing whether the inch or millimeter is selected as a unit of length is stored in a memory (not shown). When the ON/OFF switch 173D is turned on again after the switch 173D has been turned off, the unit of length is changed to the one selected before the switch 173D is turned off.

The arithmetic operation unit reads the data showing whether normal display or inverse display from the memory (not shown). From the data read, it is determined whether the numerical value is displayed on the LCD 160C with a normal-display pattern code or an inverse-display pattern code.

Figure 33:
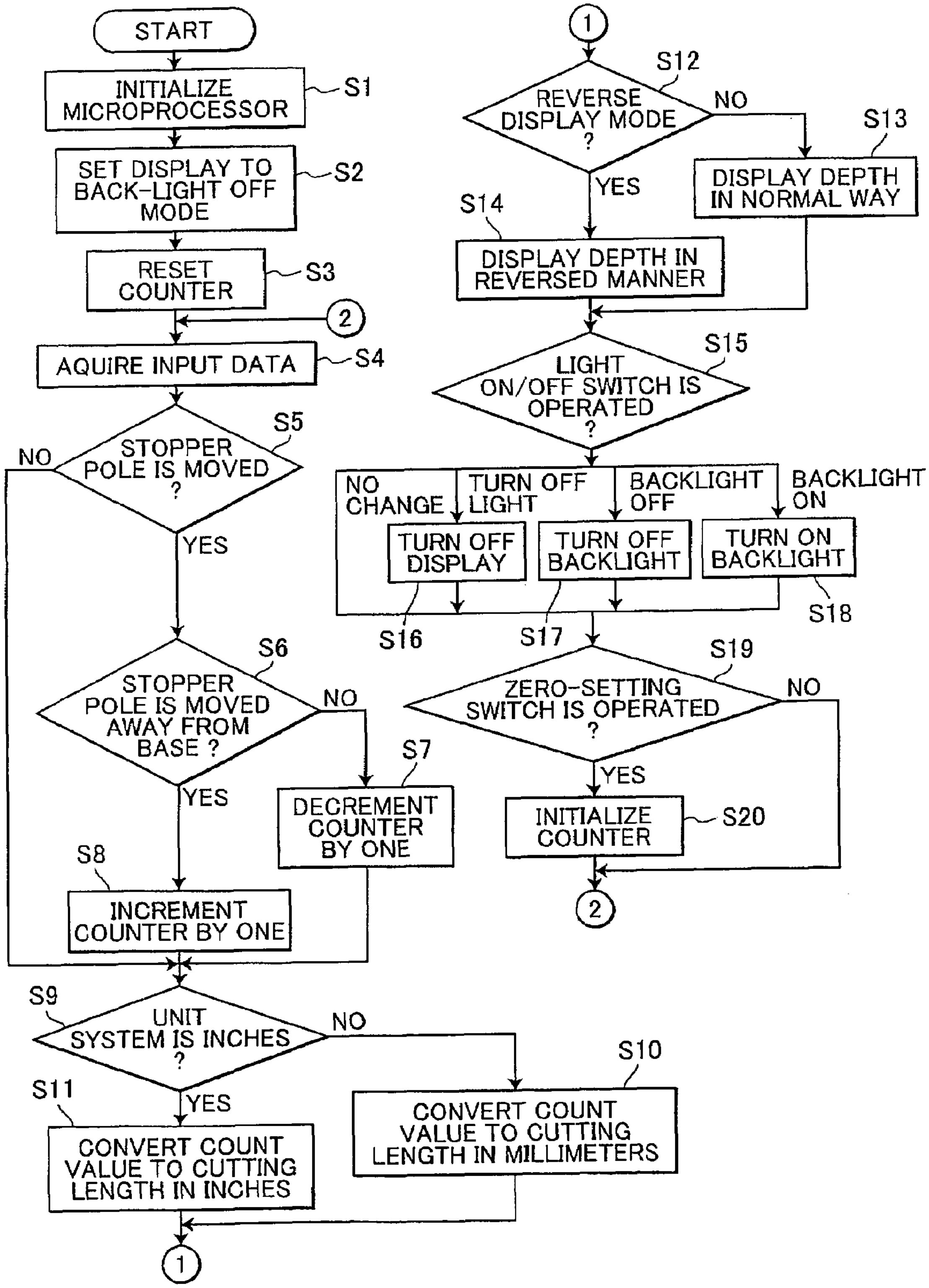
FIG. 33 is a flowchart explaining an operation of the router.

The operation of the microprocessor 201 will be explained with reference to the flowchart of FIG. 33. First, the microprocessor 201 initializes itself (S1) when the ON/OFF switch 173D is turned on. Then, the display is set to turn off the backlight and display numerical data (S2). The up-down counter of the microprocessor 201 is set to count zero (S3).

Next, the process of reading the signals A and B generated as the stopper pole 165 moves (S4). From the changes in the signals A and B, it is determined whether the stopper pole 165 has moved (S5) If Yes in S5, it is determined which direction the stopper pole 165 has moved away from the base 110(S6). If the combination of signals A and B changes from 00 to 01 through 10 and 11, the stopper pole 165 is determined to have moved away from the base 110 (Yes in S6). In this case, the count of the up-down counter is increased by one (S8). Then, it is determined whether the numerical value should be displayed in inches on the display unit 160B (S9).

If the combination of signals A and B changes from 01 to 00 through 11 and 10, the stopper pole 165 is determined to have moved to the base 110 (No in S6). In this case, the count of the up-down counter is decreased by one (S7). Then, it is determined whether the numerical value should be displayed in inches on the display unit 160B (S9). If the output levels of signals A and B do not change, and the motion of the stopper pole 165 is not detected (No in S5), it is determined whether the numerical value should be displayed in inches on the display unit 160B (S9).

If the data stored in the memory (not shown) designates the metric system, the count of the up-down counter is converted to a length in millimeters (S10). If the data designates inch system, the count of the up-down counter is converted to a length in inches (S11).

Then, it is determined whether the normal/inverse display flag stored in the memory (not shown) designates the inverse display (S12). If the flag designates the inverse display (Yes in S12), the cutting depth is displayed upside down on the display unit 160B (S14). If the flag designates the normal display (No in S12), the cutting depth is displayed in normal way on the display unit 160B (S13).

Next, it is determined whether the light ON/OFF switch 160D has been operated (S15) If the light ON/OFF switch 160D has not been operated and the state has not been changed (No in S15), it is determined whether the zero-setting switch 160E has been operated (S19). If the backlight has been turned on because the light ON/OFF switch 160D has been depressed n+1 times, where n is an integer more than or equal to 0 (backlight ON, in S15), the numerical value is displayed on the display unit 160B while the backlight remains on (S18). Then, it is determined whether the zero-setting switch 160E has been operated (S19) The user may depress the ON/OFF switch 160D n+2 times to turn off the backlight and interrupt the displaying of the numerical value (backlight OFF, in S15). In this case, the display unit 160B does not display the numerical value, while the backlight remains off (S16). Then, it is determined whether the zero-setting switch 160E has been operated (S19). If user may depress the ON/OFF switch 160D n+3 times, and the backlight is turned off (backlight OFF, in S15), the display unit 160B displays the numerical value, while the backlight remains off (S17). Then, it is determined whether the zero-setting switch 160E has been operated (S19).

If the zero-setting switch 160E has been operated (Yes in S19), the count of the up-down counter is set to zero (S20). Then, the process for reading the signals A and B starts again (S4). If the zero-setting switch 160E has not been operated (No in S19), the process for reading the signals A and B starts again (S4).

The operation of the router 101 to cut a groove in the workpiece will be explained. The user may hold the router 101 with hands, moves the router 101 to cut a groove in the workpiece. In this case, the base 110 is positioned below the main unit 130 as viewed in the vertical direction, as illustrated in FIG. 1. In this process, the user first places the base 110 on the workpiece W. The user then turns on the ON/OFF switch 173D to supply power to the electric motor 131. The electric motor 131 is thereby driven to rotate the cutter 151 through the output shaft 131A of the electric motor 131.

In this state, the user moves the main unit 130 down along the columns 111 and 112 until the lower end of the stopper pole 165 abuts on the stopper-pole position adjusting mechanism 115. As a result, the cutter 151 protrudes downward through the base-through hole 110*b* and bites into the workpiece W. The user then moves the router 101 on the workpiece W to form a groove in the workpiece W by the cutter 151.

The distance the cutter 151 projects from the sliding surface of the base 110 is the depth of the groove being cut in the workpiece W. This depth can be adjusted by moving the stopper pole 165 with respect to the main unit 130 to change the distance between the main unit 130 and the base 110. A method of adjusting the depth of the groove will be explained below.

To adjust the depth of the groove, the user first places the router 101 on the workpiece W and then turns on the ON/OFF switch 173D to supply power to the digital display unit 160. Next, the main unit 130 is moved down along the columns 111 and 112 against the bias of the compression spring 136 until the distal end of the cutter 151 touches the upper surface of the workpiece W. When the distal end of the cutter 151 touches the upper surface of the workpiece W, the lock lever 137 is tightened, thereby fixing the main unit 130.

Subsequently, the knob 130D is loosened to release the stopper pole 165. Then, the stopper pole 165 is moved down until the lower end of the pole 165 abuts on the fastening mechanism 115D. The position of the stopper pole 165 corresponds to a depth-zero position. Then, the user pushes the zero-setting switch 160E. The numerical value to be displayed on the LCD 160C is thereby reset to "0" (point-zero setting).

Referring to FIG. 11, the knob 168B is turned to rotate the shaft 168. The pinion 168A mounted on the shaft 168 also rotates The rack 165B engaged in mesh with the pinion 168A then moves upward with respect to the main unit 130. The stopper pole 165 moves up along with the rack 165B. The moving distance of the pole 165 is equal to the depth by which the cutter 151 cuts the workpiece W. In the detection unit 171, the light-receiving parts 171B receives the light beams passing through the slits 166*a*. Thus, the detection unit 171 outputs the number of pulses which corresponds to the moving distance of the stopper pole 165. From the number of pulses, the distance or the depth of the groove to be cut is calculated.

The moving distance of the stopper pole 165 is calculated and displayed on the LCD 160C as a numerical value. Looking at the numerical value displayed on the LCD 160C, the user moves the stopper pole 165 up or down until the numerical value becomes equal to the desired depth. When the numerical value becomes equal to the desired depth, the user tightens the knob 168B to fix the stopper pole 165 in position. The depth of the groove to be cut is thus adjusted.

Figure 42:
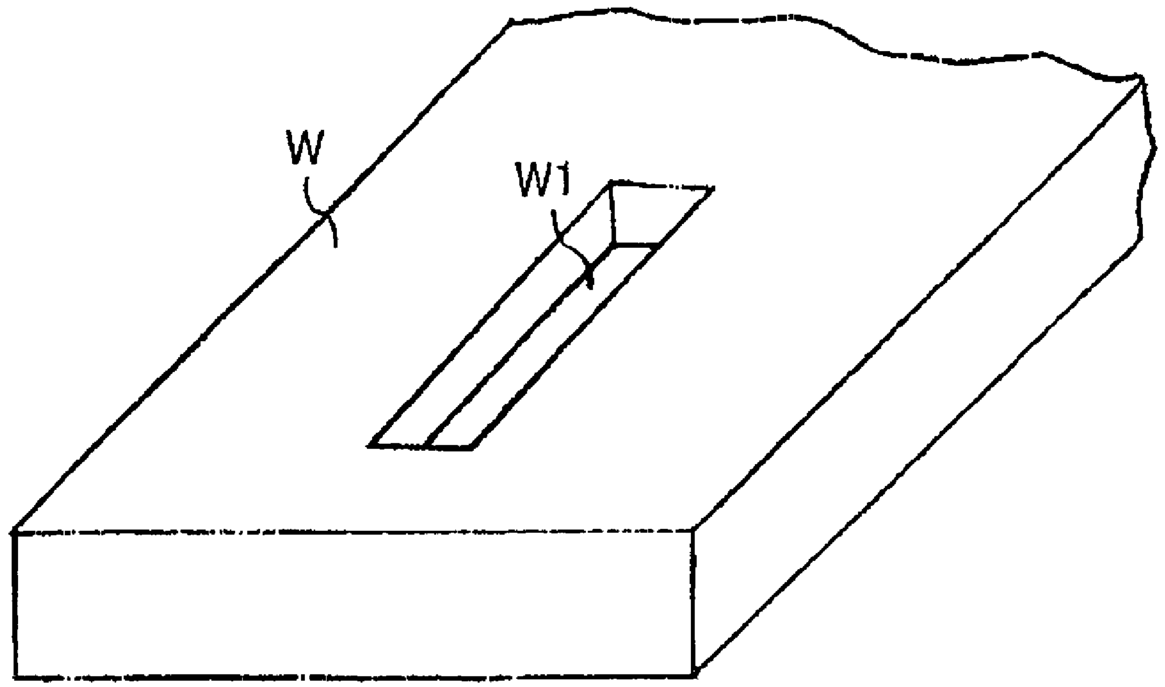
FIG. 42 is a partial perspective view of a workpiece having a groove to be cut by the rooter of the present invention.

Next, the electric motor 131 is driven to rotate the cutter 151 that is spaced apart from the workpiece W. The main unit 130 is lowered along the columns 111 and 112 until the lower end of the stopper pole 165 abuts on the stopper-pole position adjusting mechanism 115. Then, the main unit 130 is moved by a predetermined distance to cut a groove to the preset depth in the workpiece W. Thereafter, the main unit 130 is lifted by the bias force of the compression spring 136. This sequence of steps may be repeated to cut a groove W1 having a rectangular cross section as illustrated in FIG. 42.

The router 101 may be turned upside down and then be secured to the router table 102 as is illustrated in FIG. 34 A method of adjusting a depth of the groove to be formed in the workpiece by the router 101 set in the upside-down position will be explained below.

Before the router 101 is attached to the router table 102, the following steps are performed. First, the knob 130D that fastens the stopper pole 165 to the main unit 130 is loosened. Then, the stopper pole 165 is moved to fix the upper end thereof to the fastening mechanism 115D. The stopper pole 165 is thereby secured to the base 110.

In this state, the main unit 130 can be moved up and down with respect to the base 110 and the stopper pole 165. When the main unit 130 is moved, the rack 165B provided on the main unit 130 causes the pinion 168A and the shaft 23 to rotate. The detection unit 171 generates pulses based on the light beams passing through the slits 166*a*. The moving distance of the main unit 130 can be calculated based on these pulses in the same way as described above. The calculated moving distance can be displayed on the LCD 160C. In the present embodiment, the distance of the stopper pole 165 and the moving distance of the main unit 130 can be displayed on the LCD 160C.

Next, the router 101 is attached to the router table 102, upside down as shown in FIG. 34. More precisely, the base 110 is positioned above the main unit 130 in the vertical direction, and two brackets 103 are fastened with two wing nuts 104 to the lower surface of the router table 102. The changeover/TABLE switch 160F is then depressed, causing the LCD 160C to display the moving distance of the main unit 130, as illustrated in FIG. 34. This enables the is user to read the numerical value of the moving distance from the front of the router 101. If the periphery of the display unit 160B is dark, this makes it difficult to read the numerical value displayed on the LCD 160C. In this case, a light switch 32 is pushed to illuminate the display unit 160B, the router 101 can be used in a normal state in a place that is too dark to read the numerical value displayed on the LCD 160C. Once the router 101 is secured to the router table 102, the shadow of the router table 102 inevitably falls on the display unit 160B, darkening the display unit 160B. Therefore, illumination for brightening the display unit 160B is useful.

The lever member 142 is rotated to put the engagement member 138 and the male screw 117B into engagement and fix the bolt 117 with respect to the main unit 130. At this time, the main unit 130 is considered to be at a position that corresponds to the depth-zero position. The user pushes the zero-setting switch 160E to reset the numerical value displayed on the LCD 160C to "0" (point-zero adjustment).

Then, the fine-adjustment knob 149 is rotated to turn the bolt 117. The engagement member 138 set in screw engagement with the bolt 117 to move the main unit 130 up in the vertical direction. The distance the main unit 130 is equal to the projecting distance of the cutter 151 from the upper surface of the router table 102, which is also equal to the depth of the groove to be cut. This distance is displayed on the LCD 160C as described above. Seeing the numerical value displayed on the LCD 160C, the user moves the main unit 130 upward until the numerical value becomes equal to the desired depth of the groove to be cut. When the numerical value becomes equal to the depth, the user tightens the lock lever 137 to fix the main unit 130 in position. The depth is thereby adjusted. The cutter 151 therefore protrudes from the upper surface of the router table 102 by the predetermined distance corresponding to the depth of the groove to be cut.

In this embodiment, the position of the main unit 130 can be fine-adjusted easily and readily merely by rotating the fine-adjustment knob 149.

After the depth of the groove to be cut is adjusted as described above, the electric motor 131 is driven to rotate the cutter 151 with the cutter 151 being apart from the workpiece W. Then, the workpiece W is moved on the router table 102. As a result, the cutter 151 cuts the workpiece W to make a groove having that depth.

The above description explains a method to adjust the depth when the router 101 is secured to the router table 102 and the base 110 is positioned above the main unit 130 in the vertical direction. In another embodiment, the depth can be adjusted in the same way when the router 101 cuts a groove without using the router table 102.

As described above, both the moving distance of the stopper pole 165 with respect to the main unit 130 and the moving distance of the main unit 130 with respect to the base 110 are displayed on the LCD 160C, as the depth of the groove to be cut. While looking at these displayed distances, the user can move the stopper pole 165 or the main unit 130 to adjust the depth accurately and easily. The user can adjust the depth of the groove when using the router 101 to the router table 102.

When the user holds the router 101, the rack-pinion mechanism moves the stopper pole 165 with respect to the main unit 130. Thus, the depth of the groove to be cut can be adjusted accurately and easily.

When the router 101 is secured to the router table 102, the knob 130D is turned to move the main unit 130 with respect to the base 110 and thereby adjusting the cutting depth to a prescribed value. In this case, the user can easily switch the display mode from the mode of displaying the moving distance of the stopper pole 165 with respect to the main unit 130 to the mode of displaying the moving distance of the main unit 130 with respect to the base 110.

In the embodiment of this invention, the LCD 160C can display both the moving distance of the stopper pole 165 with respect to the base 130 and the moving distance of the main unit 130 with respect to the base 110, each as a digital value. Hence, the LCD 160C can be made smaller and more compact. In addition, the user can perform the same operation to display the distance on the LCD 160C for both of the case in which the user holds the router 101 with hands, and the case in which the user secures the router 101 to the router table 102. This simplifies the adjustment of the depth of the groove to be cut.

In this embodiment, the moving distance of the stopper pole 165 with respect to the main unit 130 or the moving distance of the main unit 130 with respect to the base 110 is displayed on the LCD 160C, in an upside-down fashion. Therefore, even if the router 101 is attached to the router table 102 upside down, the LCD 160C can display the numerical value in such a way that the user can read the value correctly and easily.

The router according to the present invention is not limited to the embodiment described above. Various changes and modifications can be made, without departing from the scope defined by the claims set forth hereinafter. In the above embodiments, the washer 140 is mounted on the screw 141 and laid on the distal end of the engagement projection 138B (FIGS. 8 and 9), and the small-diameter part 139B of the drive member 139 abuts on the washer 140. When the drive member 139 moves away from the bolt 117, the drive member 139 abuts on the washer 140. The washer 140 and the engagement member 138 therefore move together with the drive member 139. As a result, the engagement member 138 is moved from the disengaged position to the engaged position. Nonetheless, the invention is not limited to this configuration.

For example, as shown in FIGS. 35 to 38, the engagement member 138 may not have the engagement projection 138B, and the washer 140 and the screw 141 may not be provided on the distal end of the engagement projection 138B. In this configuration, the knob part 137A (FIG. 2) is turned to move the drive member 139 to the bolt 117. Then, the drive member 139 pushes the engagement member 138 to the right in FIGS. 35 to 38 and the engagement member 138 is set at the disengaged position. When the drive member 139 is moved away from the bolt 117 as the knob part 137A is turned, the bias force of the compression spring 145 drives the engagement member 138 leftward in FIGS. 35 to 38 to the engaged position.

Figure 39:
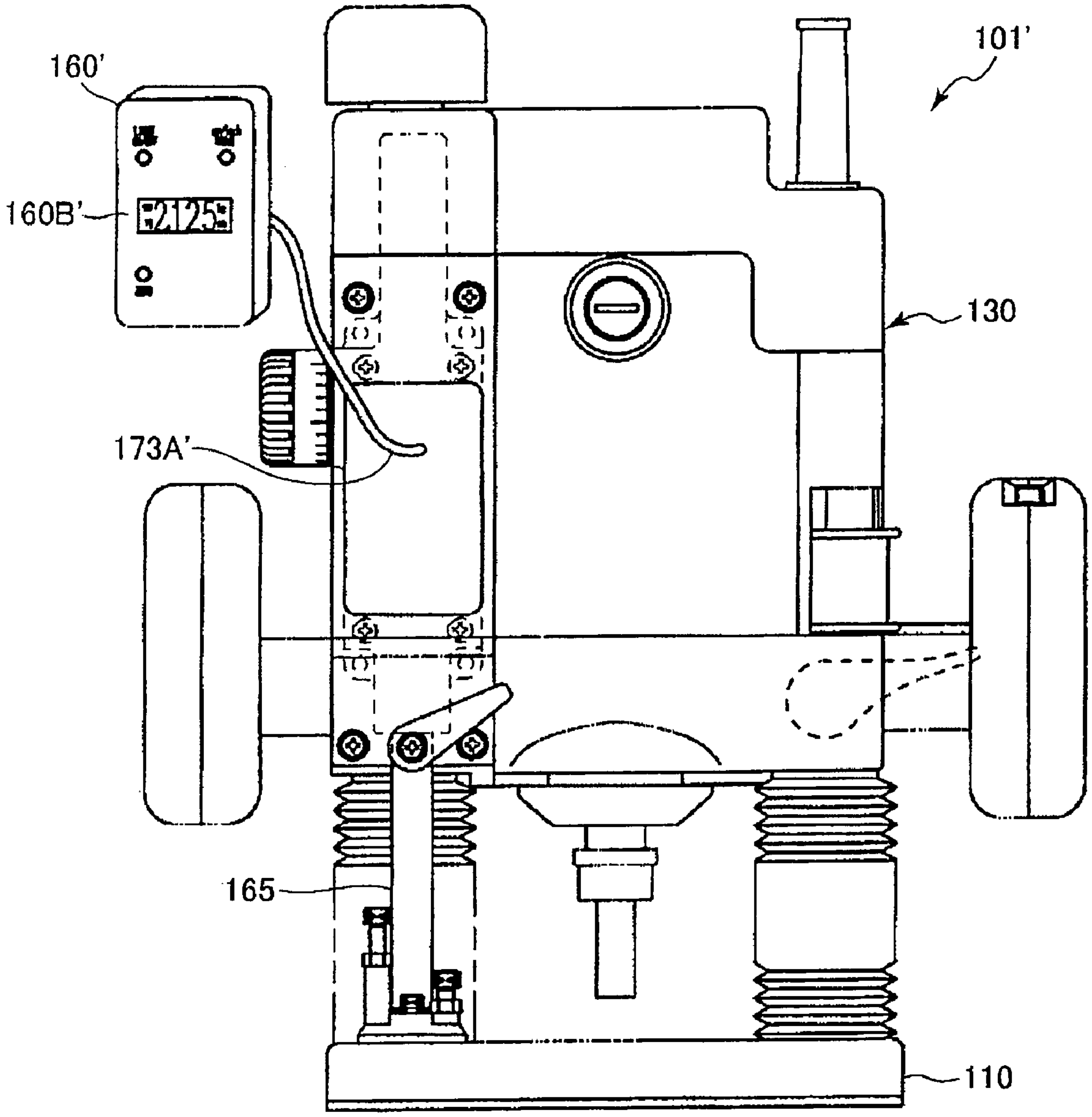
FIG. 39 is a front view showing a router according to another embodiment of the present invention.
Figure 40:
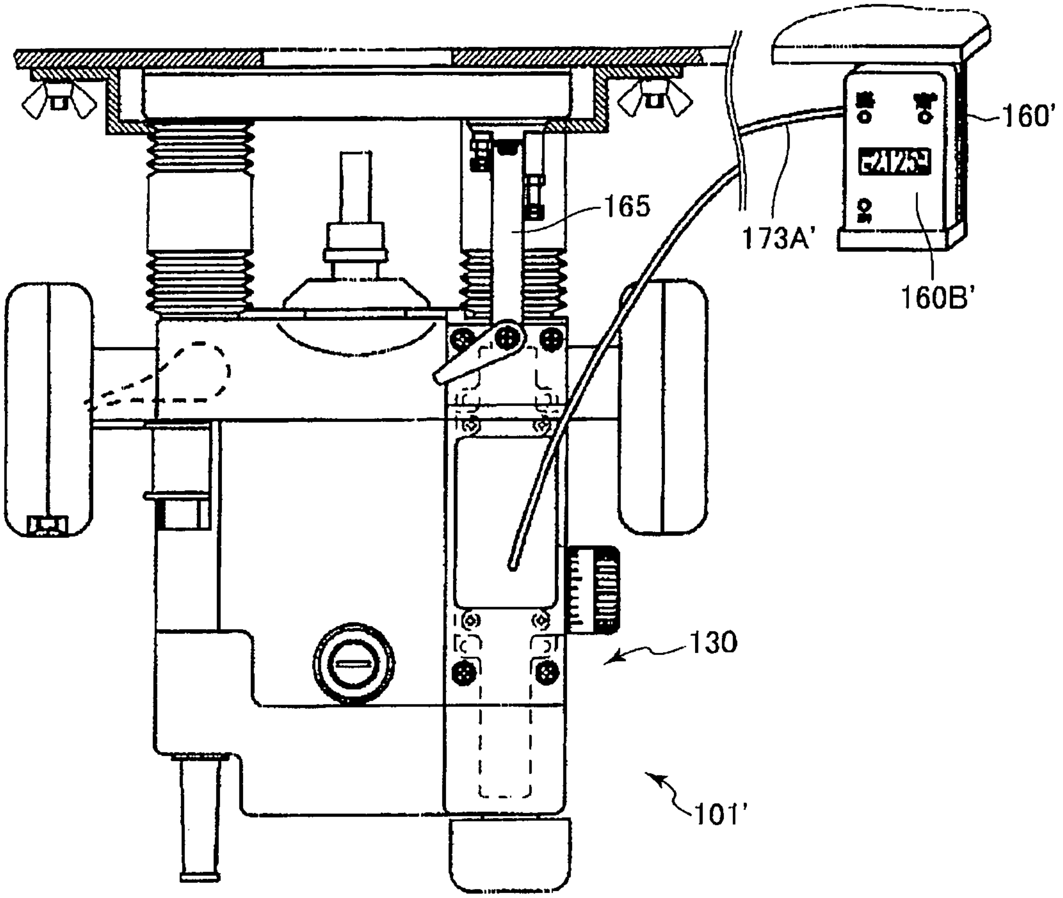
FIG. 40 is a front view depicting the router used together with a router table.

The digital display unit 160' is positioned separated from the main unit 130 as shown in FIGS. 39 and 40. In this case, the digital display unit 160' is electrically connected to the main unit 130 in order to display the position of the stopper pole 165 with respect to the main unit 130. To this end, a cord 173A' connects the digital display unit 160' to the main unit 130 as shown in FIGS. 39 and 40.

If the router 101' is used with the digital display unit 160' removed from the main unit 130, the digital display unit 160' need not be positioned upside down, regardless of the positional relationship between the base 110 and the main unit 130 in the vertical direction. Hence, the user can correctly read the numerical value on the display unit 160B'.

In this case, the distal display unit 160' may not be connected to the main unit 130 by a cord. Instead, the numerical data may be exchanged between the digital display unit 160' and the main unit 130 by radio communication, and the digital display unit may have a power supply separated from the power supply for driving the electric motor.

Figure 41:
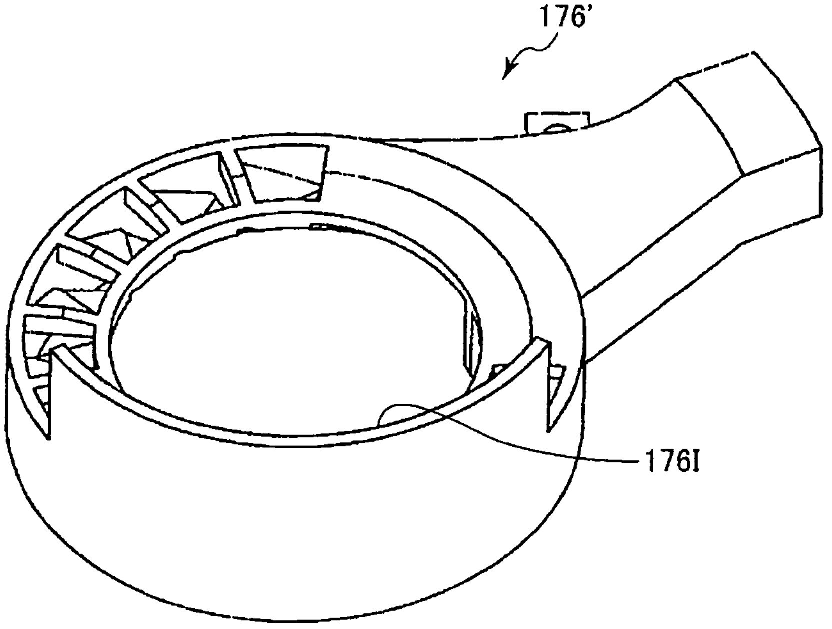
FIG. 41 is a perspective view of the dust guide incorporated in the router.

As shown in FIG. 41, the dust guide 176 that opposes the annular through hole 130*d* of the main unit 130 may have a chip-flying restricting wall 176I. The wall 176I extends toward the annular through hole 130*d*. The chip-flying restricting wall 176I prevents chips from scattering out of the dust guide 176 while the cutter 151 is cutting a groove in the workpiece.

The detection unit is not limited to the type described above. Instead, the detection unit may be a photoelectric type having a photosensor of a light shield, an electrostatic capacitor type that changes in electrostatic capacitance, or a magnetic type that detects the magnetic fluxes emanating from magnetic poles provided on the stopper pole at regular intervals.

The fastening mechanism 115D is located around the turntable section 115A. The mechanism 115D may have a different configuration, except that the mechanism 115D abuts on one end of the stopper pole and holds the stopper pole to disable the stopper pole to move with respect to the base.

The main unit 130 incorporates the centrifugal fan 133. The fan 133 may be replaced with any other type of fan.

The hollow cylindrical part of the dust guide may have a larger inside diameter in the lower end that abuts on the dust-guide receptacle than in the upper end that faces the annular through hole. If the hollow cylindrical part has this structure, the fan air can blow chips outward in the radial direction of the dust guide, or from the center of the hollow cylindrical part toward the inner circumferential surface thereof.

In the above embodiment, the stopper pole 165 is provided. In another embodiment, the stopper pole 165 can be eliminated. In this case, the router may have any unit for detecting the positions of the columns with respect to the main unit or the position of the bolt with respect to the main unit.

Further, the light ON/OFF switch 160D and the zero-setting switch 160E, both shown in FIG. 10, may be exchanged in position. In other words, the zero-setting switch 160E may be located above the light ON/OFF switch 160D. Positioned above the light ON/OFF switch 160D, the zero-setting switch 160E that is more frequently used than the switch 160D is positioned near the knob 168B for fine-adjusting the stopper pole 165, thereby being easily depressed.

When the engagement member is engaged with the bolt and the bolt is rotated about the longitudinal axis, the engagement member is threaded and moved with respect to the bolt in the perpendicular direction to the base. Accordingly, threading movement of the engagement member moves the main unit with respect to the base. Hence, the position of the main unit can be finely adjusted with respect to the base and the bolt.

Unless the male thread of the drive member is threaded and moved with respect to the first female thread portion, the engagement member is maintained at one of the engaged position and the disengaged position. Hence, the user does not have to do anything to maintain the engagement member at the one of the engaged position and the disengaged position.

The engagement member is moved together with the drive member due to the treading movement of the drive member, so that the engagement member is moved between the engaged position and the disengaged position.

When the engagement member moves together with the drive member due to a threading movement of the drive member, the male thread of the drive member can be urged to the female thread of the main unit. Accordingly, no play develops between the male thread and the female thread.

The engagement member can be moved to the engaged position by an elastic force of the elastic member.

The restricting unit restricts a pivot of the operation member when the engagement member is in one of the engaged position and the disengaged position. Hence, the operation member is prevented from rotating beyond the operational range of the operation member.

When the fastening member is loosened at the coupling portion, the positional relation between the lever member and the drive member is finely adjustable. Hence, when the restricting unit restricts the pivot of the operation member, the position of the drive member can be finely adjusted so that the engagement member can be located at an optimal engaged position or an optimal disengaged position.

What is claimed is:

1. A power tool comprising:

a base having a sliding surface slidable on a workpiece, another surface opposite to the sliding surface, and an opening provided through the base to extend from the sliding surface to the another surface;

a main unit supported on the base to oppose the another surface, and movable in a first direction substantially perpendicular to the sliding surface, the main unit including an electric motor; and a cutter driven by the electric motor, the cutter being capable of protruding through the opening and out from the sliding surface when the main unit is moved in the first direction toward the base;

a bolt having a longitudinal axis and extending in the first direction, the bolt having a male thread portion useable to effect positional adjustment of the main unit in the first direction, the bolt having one end supported by the base on the another surface, the bolt being rotatable about the longitudinal axis;

an engagement member related with the main unit, and having a female thread portion threadably engage-able with the male thread portion and useable to effect positional adjustment of the main unit in the first direction, the engagement member being movable between an engaged position and a disengaged position, the engaged position being a position at which the male thread portion is engaged with the female thread portion, the disengaged position being another position at which the male thread portion is disengaged with the female thread portion; and a unit for maintaining the engagement member at the disengaged position.

2. The power tool as claimed in claim 1, comprising:

a female drive thread portion provided in the main unit, useable to effect engagement/disengagement movement of the engagement member, wherein the unit comprises a drive member abutable on the engagement member in a second direction, the drive member having a male drive thread portion on an outer circumferential surface thereof useable to effect engagement/disengagement movement of the engagement member, the male drive thread portion being threadably engaged with the female drive thread portion, and the engagement member is moved between the engaged position and the disengaged position by moving the male drive thread portion with respect to the female drive thread portion.

3. The power tool as claimed in claim 2, wherein a moving direction of the drive member by moving the male drive thread portion with respect to the female drive thread portion is perpendicular to the longitudinal axis, and the engagement member is moved between the engaged position and the disengaged position in conjunction with threading of the drive member with respect to the female drive thread portion.

4. The power tool as claimed in claim 2, wherein:

the engagement member has a outer circumferential surface and a projecting portion protruding therefrom in the second direction, the projecting portion having a longitudinal axis, a circumferential surface, and an abutment member provided on a distal end thereof, the abutment member having a flange shape, and the drive member is positioned on the circumferential surface of the projecting portion between the abutment member and the outer circumferential surface of the engagement member, the drive member being rotatable about the longitudinal axis of the projecting portion and contactable with the abutment member and the outer circumferential surface of the engagement member.

5. The power tool as claimed in claim 2, comprising an elastic member for urging the engagement member in the second direction, from the disengaged position to the engaged position.

6. The power tool as claimed in claim 5, wherein the drive member is movable in a direction perpendicular to the longitudinal axis of the bolt by threading and moving the male drive thread portion with respect to the female drive thread portion, the drive member contacts and presses the engagement member toward the disengaged position when the drive member threads and moves toward the bolt, and the engagement member is urged to move toward the engaged position by the elastic member when the drive member threads away from the bolt.

7. The power tool as claimed in claim 2, comprising:

an operation member configured to be rotatable for transferring a rotating force to the drive member to thread and move the drive member; and a restricting unit for restricting an angular position of the operation member, the restricting unit restricting rotation of the operation member when the engagement member is in one of the engaged position and the disengaged position.

8. The power tool as claimed in claim 7, wherein the drive member has a rotation axis, the operation member comprises a lever member having a projection extending in a direction perpendicular to the rotation axis of the drive member, the restricting unit is provided in a part of the main unit covered by pivot of the lever member, and the projection is pivoted to abut on the restricting unit, thereby restricting the pivot of the lever member.

9. The power tool as claimed in claim 7, wherein the lever member and the drive member are coupled to each other by a coupling portion so that the lever member is rotatable with respect to the drive member, the coupling portion comprises a fastening member for restricting rotation of the lever member with respect to the drive member, thereby fastening the lever member to the drive member.

10. A power tool comprising:

a base having a sliding surface slidable on a workpiece, another surface opposite to the sliding surface, and an opening through the base extending from the sliding surface to the another surface;

a main unit supported on the base to oppose the another surface, and movable in a first direction substantially perpendicular to the sliding surface, the main unit including an electric motor; and a cutter driven by the electric motor, the cutter being configured to protrude through the opening and out the sliding surface when the main unit is moved toward the base;

a bolt having a longitudinal axis and extending in the first direction, the bolt having a male thread portion useable to effect positional adjustment of the main unit in the first direction, the bolt having one end supported by the base on the another surface, the bolt being rotatable about the longitudinal axis; and an engagement member provided in the main unit and having a female thread portion threadably engage-able with the male thread and useable to effect positional adjustment of the main unit in the first direction, the engagement member being movable between an engaged position and a disengaged position, the engaged position being a position at which the male thread portion is engaged with the female thread portion, the disengaged position being another position at which the male thread portion is disengaged with the female thread portion, wherein rotation of the bolt causes the male thread portion to thread with respect to the female thread portion when the engagement member is at the engaged position, thereby moving the main unit in the first direction and adjusting a distance of the main unit with respect to the sliding surface, and wherein the engaged member is maintained at the disengaged position without any external force when the engaged member is at the disengaged position.

* * * * *